United States Patent
Fu et al.

(10) Patent No.: US 11,305,430 B2
(45) Date of Patent: Apr. 19, 2022

(54) PALLET BUILDING SYSTEM WITH FLEXIBLE SEQUENCING

(71) Applicant: Symbotic LLC, Wilmington, MA (US)

(72) Inventors: Ke Fu, Wilmington, MA (US); Wenyin San, Wilmington, MA (US); Rick Youping Huang, Westford, MA (US)

(73) Assignee: Symbotic LLC, Wilmington, MA (US)

( * ) Notice: Subject to any disclaimer, the term of this patent is extended or adjusted under 35 U.S.C. 154(b) by 0 days.

(21) Appl. No.: 17/091,265

(22) Filed: Nov. 6, 2020

(65) Prior Publication Data
US 2021/0139256 A1 May 13, 2021

Related U.S. Application Data

(60) Provisional application No. 62/933,833, filed on Nov. 11, 2019.

(51) Int. Cl.
| | |
|---|---|
| *G06F 7/00* | (2006.01) |
| *B25J 9/16* | (2006.01) |
| *B65G 57/02* | (2006.01) |
| *G05B 15/02* | (2006.01) |
| *B65G 61/00* | (2006.01) |
| *G05B 19/418* | (2006.01) |

(Continued)

(52) U.S. Cl.
CPC ........... *B25J 9/1687* (2013.01); *B65G 57/02* (2013.01); *B65G 61/00* (2013.01); *G05B 15/02* (2013.01); *G05B 19/4189* (2013.01); *G05B 19/41865* (2013.01); *G06Q 10/06316* (2013.01); *G06Q 10/08* (2013.01); *G06Q 10/087* (2013.01); *G06Q 50/28* (2013.01); *B65G 57/03* (2013.01); *G05B 2219/40006* (2013.01)

(58) Field of Classification Search
CPC . B25J 9/1687; G06Q 10/06316; G06Q 10/08; G06Q 10/087; G06Q 50/28; G06Q 10/043; G05B 19/4189; G05B 19/41865; G05B 15/02; G05B 2219/40006; B65G 57/02; B65G 61/00; B65G 57/03
USPC ......................................... 700/213–217, 228
See application file for complete search history.

(56) References Cited

U.S. PATENT DOCUMENTS

| | | |
|---|---|---|
| 5,908,283 A | 6/1999 | Huang et al. |
| 6,273,670 B1 | 8/2001 | Henson et al. |

(Continued)

FOREIGN PATENT DOCUMENTS

JP 2000168958 6/2000

*Primary Examiner* — Yolanda R Cumbess
(74) *Attorney, Agent, or Firm* — Perman & Green, LLP

(57) ABSTRACT

An automated palletizer for building a mixed case pallet, the automated palletizer including a case infeed that feeds mixed cases to provide an input queue feed sequence of mixed cases. At least one pallet building robot communicably connected to the case infeed and configured to receive the mixed cases in the input queue feed sequence of mixed cases, and place the mixed cases according to and dependent on the input queue feed sequence of mixed cases so as to effect building the mixed case pallet at a predetermined substantially steady placement rate. A controller communicably connected to the case infeed and at least one pallet building robot, and being configured so as to generate a complete and stable mixed case arrangement plan that completes at least a predetermined whole part of the mixed case pallet and that describes a predetermined planned location and pose for each case.

18 Claims, 16 Drawing Sheets

(51) Int. Cl.
*G06Q 50/28* (2012.01)
*G06Q 10/08* (2012.01)
*G06Q 10/06* (2012.01)
B65G 57/03 (2006.01)

(56) References Cited

U.S. PATENT DOCUMENTS

| | | |
|---|---|---|
| 6,699,007 B2 | 3/2004 | Huang et al. |
| 6,718,229 B1 | 4/2004 | Takebayashi et al. |
| 7,266,422 B1 | 9/2007 | DeMotte et al. |
| 8,406,917 B2 | 3/2013 | Khan et al. |
| 8,583,277 B2 | 11/2013 | Kuehnemann et al. |
| 9,914,601 B2 | 3/2018 | Morency et al. |
| 9,984,405 B2 | 5/2018 | O'Neil |
| 10,618,172 B1 * | 4/2020 | Diankov ............... B25J 9/1661 |
| 2019/0248604 A1 | 8/2019 | Pankratov et al. |

* cited by examiner

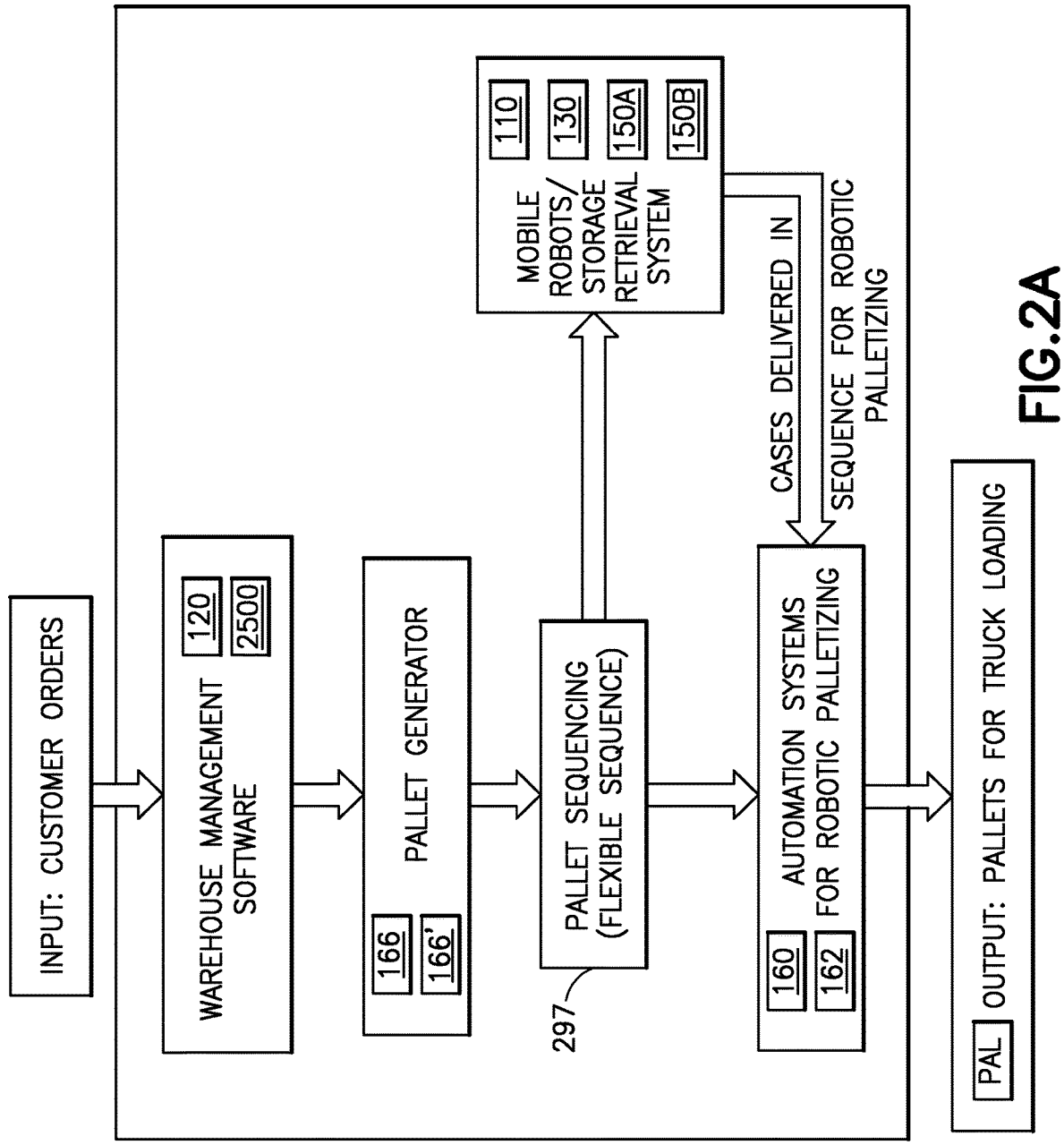

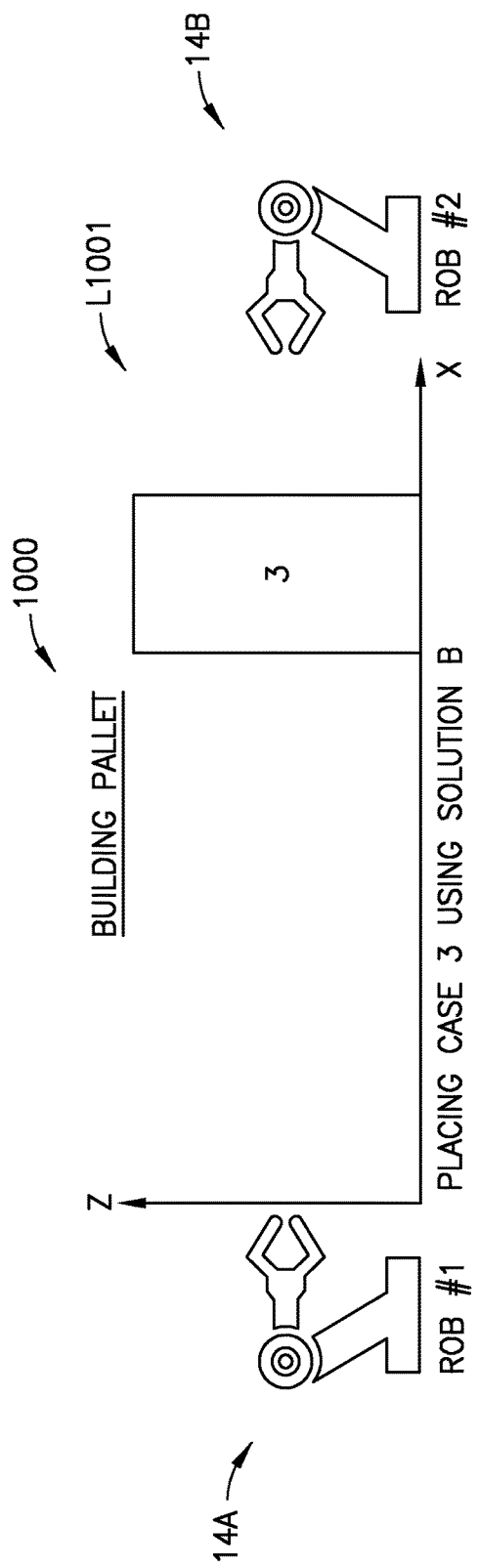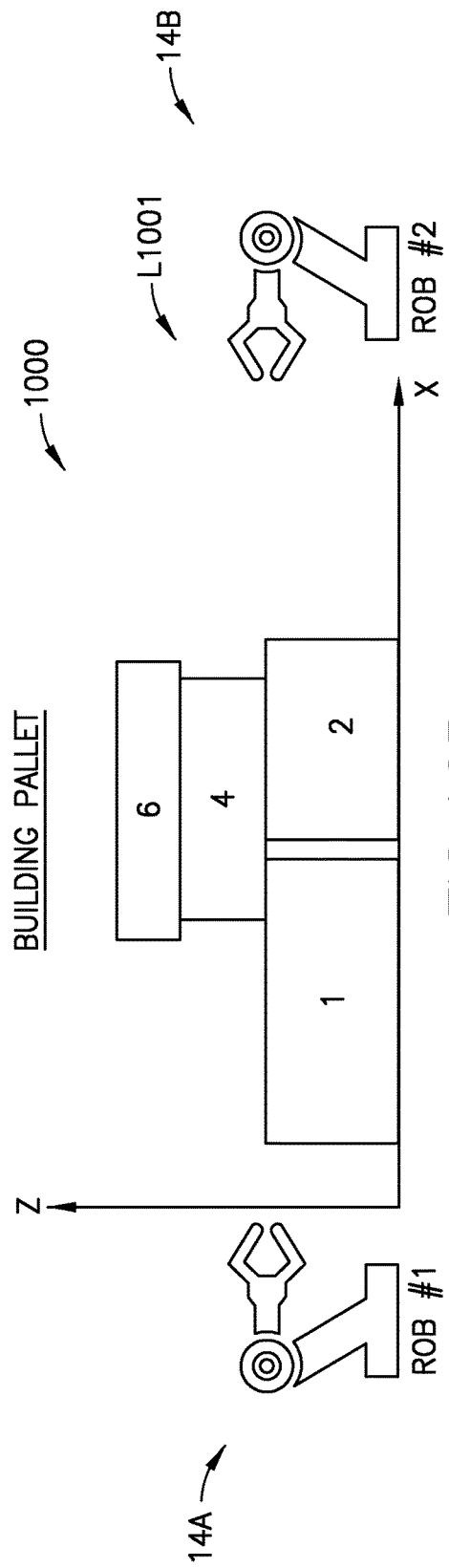

PALLET BUILDING SYSTEM WITH FLEXIBLE SEQUENCING

CROSS-REFERENCE TO RELATED APPLICATIONS

This application is a non-provisional of and claims the benefit of U.S. provisional Patent Application No. 62/933,833, filed on Nov. 11, 2019, the disclosure of which is incorporated by reference herein in its entirety.

BACKGROUND

1. Field

The exemplary embodiments generally relate to automated storage and retrieval systems, and more particularly, to automated palletizers.

2. Brief Description of Related Developments

Automated storage and retrieval systems with random access arrangements to efficiently store and retrieve a high order mix of products (e.g., cases, packages, totes, etc.) are desired to fulfill customer orders for a wide range of products. However, the fulfillment output of the automated storage and retrieval system (i.e., the fulfilled customer orders) is defined in one aspect by the mixed case pallet build of the mixed cases (or the palletized mixed cases) fulfilling the customer orders. Hence, the output (and operative efficiency) of the automated storage and retrieval system is dependent on and delimited by the efficiency of the palletizer or pallet cell building the fulfillment pallet of mixed cases. Proper mechanical and structural arrangement of the pallet cell, and its interface to the automated storage and retrieval engine (SRE) feeding the pallet cell, only go partway to providing an efficient pallet cell or palletizer. It is desired that the system and method in which the mixed case pallet is structured and built by the pallet cell also be efficient, for example, to realize efficiency of the automated storage and retrieval system (i.e., automated storage and retrieval engine and palletizer) in fulfilling customer orders.

BRIEF DESCRIPTION OF THE DRAWINGS

The foregoing aspects and other features of the present disclosure are explained in the following description, taken in connection with the accompanying drawings, wherein:

FIG. 2A is a schematic illustration of a flexible sequencer of the automated material handling system of FIG. 2;

FIGS. 10A-10D are a schematic illustrations of the palletizer of FIGS. 2 and 4 with an exemplary pallet layer in various stages of completion in accordance with aspects of the present disclosure;

DETAILED DESCRIPTION

Figure 2:
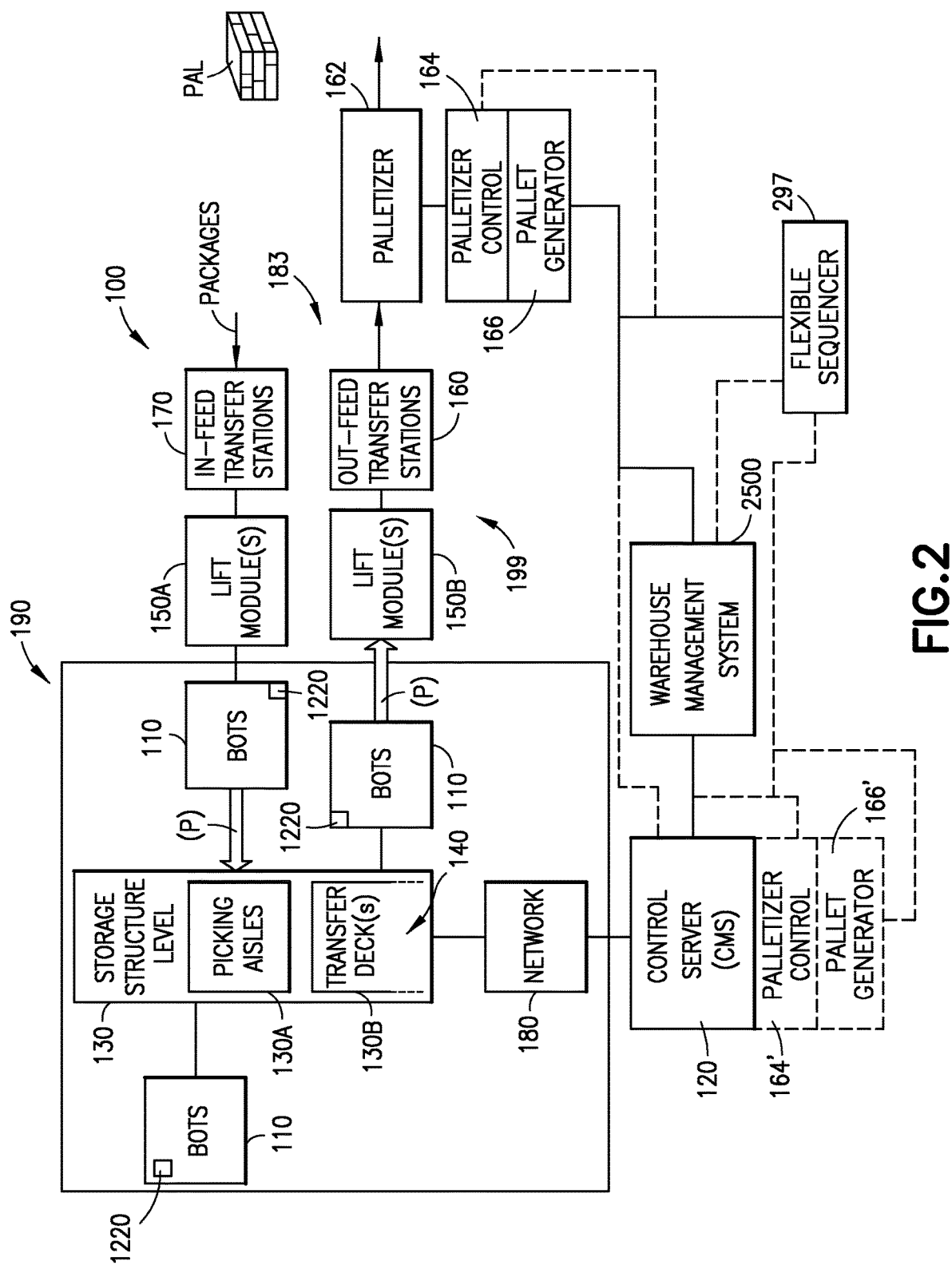
FIG. 2 is a schematic illustration of an automated material handling system for case storage and retrieval and for generating the pallet load of FIG. 1A, and incorporated aspects of the present disclosure.

FIG. 2 illustrates an exemplary automated storage and retrieval system 100 in accordance with aspects of the present disclosure. Although the aspects of the present disclosure will be described with reference to the drawings, it should be understood that the aspects of the present disclosure can be embodied in many forms. In addition, any suitable size, shape or type of elements or materials could be used.

As noted before, the customary retail replenishment unit is the case, and in accordance with the aspects of the present disclosure, the automated storage and retrieval system 100 in FIG. 2, may be disposed in a retail distribution center or warehouse, for example, to fulfill orders received from retail stores for replenishment goods shipped in cases, packages, and or parcels. The terms case, package and parcel are used interchangeably herein and as noted before may be any container that may be used for shipping and may be filled with case or more product units by the producer. Case or cases as used herein means case, package or parcel units not stored in trays, on totes, etc. (e.g. uncontained). It is noted that the case units CU (also referred to herein as mixed cases, cases, and shipping units) may include cases of items/unit (e.g. case of soup cans, boxes of cereal, etc.) or individual item/units that are adapted to be taken off of or placed on a pallet (see FIG. 1A). In accordance with the exemplary embodiments, shipping cases or case units (e.g. cartons, barrels, boxes, crates, jugs, shrink wrapped trays or groups or any other suitable device for holding case units) may have variable sizes and may be used to hold case units in shipping and may be configured so they are capable of being palletized for shipping. It is noted that when, for example, incoming bundles or pallets (e.g. from manufacturers or suppliers of case units arrive at the storage and retrieval system for replenishment of the automated storage and retrieval system 100, the content of each pallet may be uniform (e.g. each pallet holds a predetermined number of the same item—one pallet holds soup and another pallet holds cereal). As may be realized, the cases of such pallet load may be substantially similar or in other words, homogenous cases (e.g. similar dimensions), and may have the same SKU (otherwise, as noted before the pallets may be "rainbow" pallets having layers formed of homogeneous cases). As pallets leave the storage and retrieval system, with cases filling replenishment orders, the pallets may contain any suitable number and combination of different case units (e.g. each pallet may hold different types of case units—a pallet holds a combination of canned soup, cereal, beverage packs, cosmetics and household cleaners). The cases combined onto a single pallet may have different dimensions and/or different SKU's.

Figure 1A:
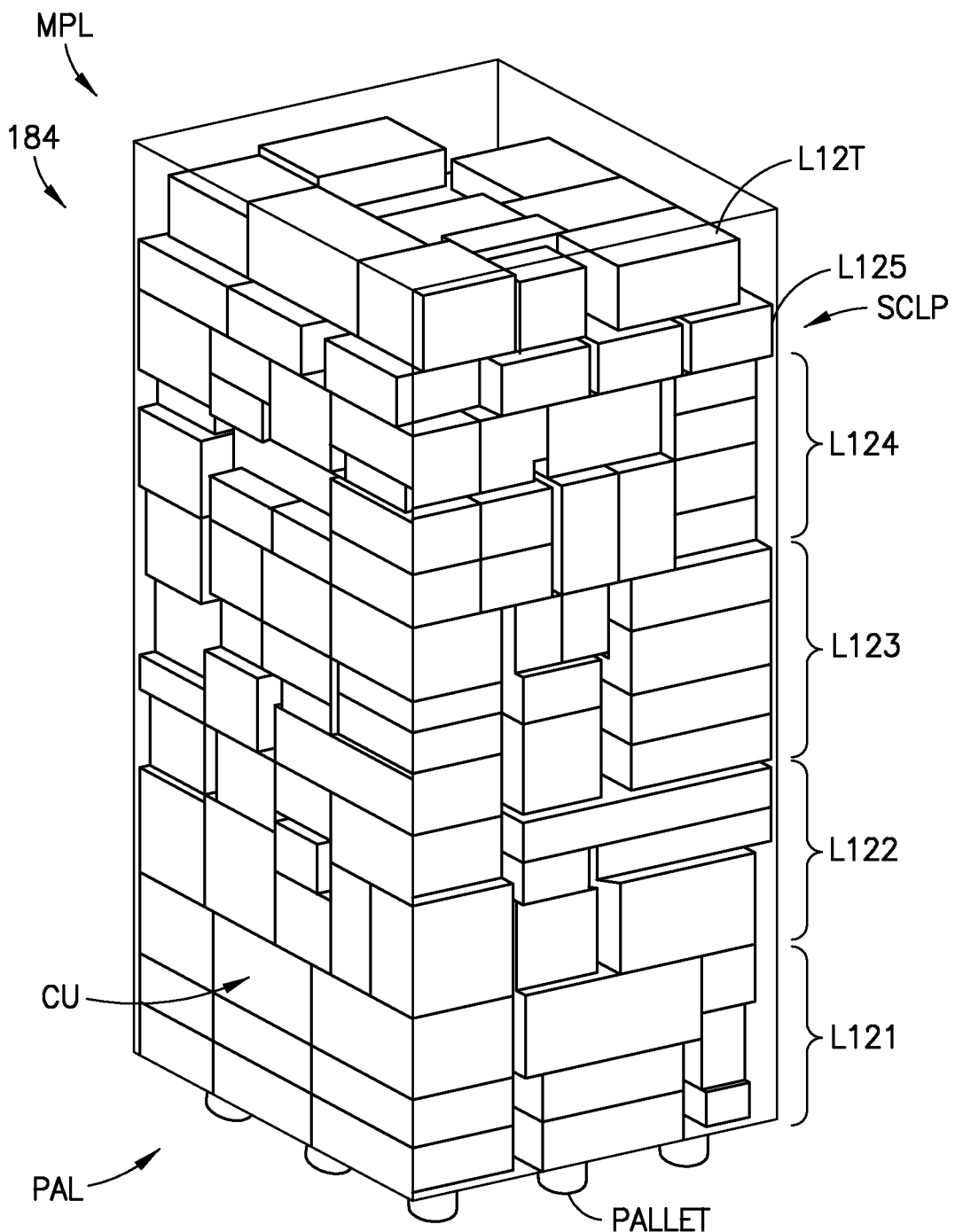
FIG. 1A is a schematic illustration of pallet load in accordance with aspects of the present disclosure.
Figure 1B:
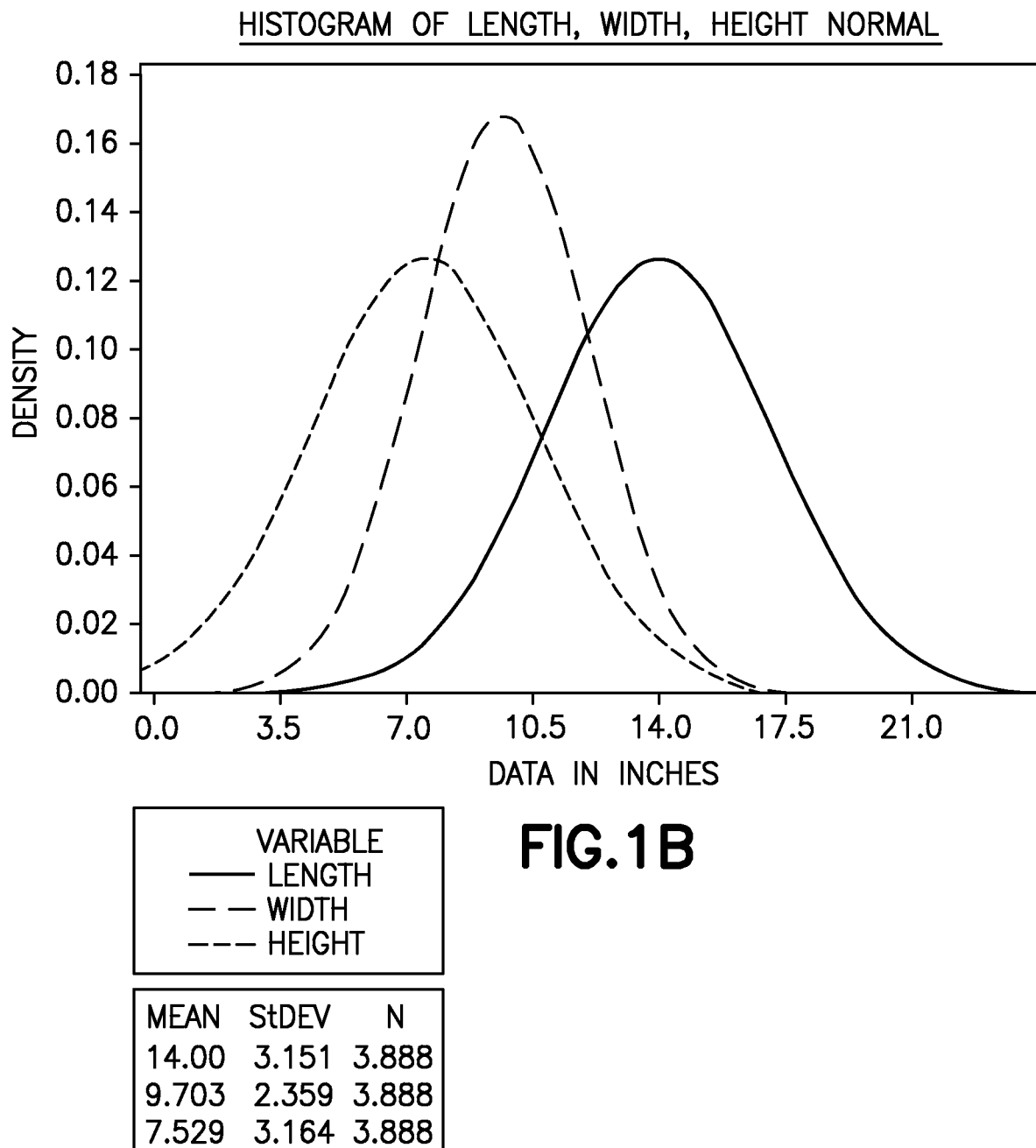
FIG. 1B is a graph illustrating a variation of case dimensions within a representative population of cases in accordance with aspects of the present disclosure.

Referring also to FIGS. 1A and 1B, there is shown a schematic perspective view of a general mixed case pallet built in accordance with aspects of the present disclosure. It is noted that when, for example, incoming bundles or pallets (e.g. from manufacturers or suppliers of case units arrive at the storage and retrieval system for replenishment of the automated storage and retrieval system 100, the content of each pallet may be uniform (e.g. each pallet holds a predetermined number of the same item—one pallet holds soup and another pallet holds cereal). As may be realized, the cases of such pallet load may be substantially similar or in other words, homogenous cases (e.g. similar dimensions), and may have the same SKU (otherwise, as noted before the pallets may be "rainbow" pallets having layers formed of homogeneous cases). The pallet PAL shown in FIG. 1A may be referred to as a level layer pallet, wherein the pallet is built by placing cases one case layer L121-L125, L12T at a time (cases may be placed individually or in partial or whole layers as noted above until the level layer L121-L125, L12T is complete before proceeding to the next level layer L121-L125, L12T. The pallet PAL is a highly heterogeneous case order where the degree of heterogeneity that may be encountered when building mixed case pallets, may be better understood from the curves shown in FIG. 1B. FIG. 1B is a graph illustrating the variation of case dimensions (e.g. length, height and width) within a representative population of cases such as may be found in the storage and retrieval system and used to generate the mixed case pallets according to customer replenishment orders. As may be realized, the orders may result in mixed case pallets including many cases with dimensions from disparate portions of the dimension spectrum illustrated in FIG. 1B. In one aspect, the pallet PAL (or a portion thereof) may be loaded with cases in columns or stacked in layers to the maximum allowable pallet height. Cases within layers rest on support surfaces of the underlying case layers within the pallet PAL, and conversely the underlying case layer surfaces delimit the cases in layers that may be placed above. Relaxation of the limits on sizes of under cases has a detrimental and undesirable effect on pallet stability. The aspects of the present disclosure overcome stability problems of as will be described further below.

The highly heterogeneous pallets PAL may be formed with a pallet planner arrangement (similar to that described in U.S. Pat. No. 8,965,559 issued on Feb. 24, 2015 and titled "Pallet Building System", the disclosure of which is incorporated herein by reference in its entirety) that is configured to plan structure of the pallet load and separate sequencer. The pallet planner generates planned pallet structure (i.e., the mixed case arrangement plan) 184 including boundary conditions and constraints imposed by pallet size, case characteristics, packing efficiency according to planning system or process in a manner similar to that described in U.S. Pat. No. 8,965,559 (previously incorporated herein by reference in its entirety). As shown in FIG. 1A, at least one layer in the complete and stable mixed case pallet structure 184 has a substantially flat deterministic top surface, so as to form a seating surface for interchangeably placing the mixed cases CU thereon, extending over a predetermined area of a pallet covered with multiple stacked mixed cases CU of the complete and stable mixed case pallet structure, or a free undeterministic surface forming a topmost boundary surface (see layer L12T) of the complete and stable mixed case pallet structure.

It may be realized that generating sequencing that resolves how to build the complete and stable mixed case arrangement plan 184 is decoupled from the generation of the mixed case pallet arrangement plan 184. Decoupling the generation of the sequencing from the generation of the mixed case pallet plan enables optimizing both the mixed case pallet arrangement plan 184 (e.g., to resolve fulfillment of mixed cases to an arrangement for an efficiently packed and stable pallet load PAL) and the solution sequence of mixed cases for the palletizer building the pallet load PAL to the mixed case arrangement plan 184 (e.g., to provide efficient (e.g., time optimal, or not waiting) substantially continuous case placement action of the palletizer 162 building the pallet load PAL, and robustness that compensates, in substantially real time, for sequencing anomalies that may occur in an extended series of retrieval transactions of the storage and retrieval engine (SRE) 190 output, as will be further described herein).

Figure 3:
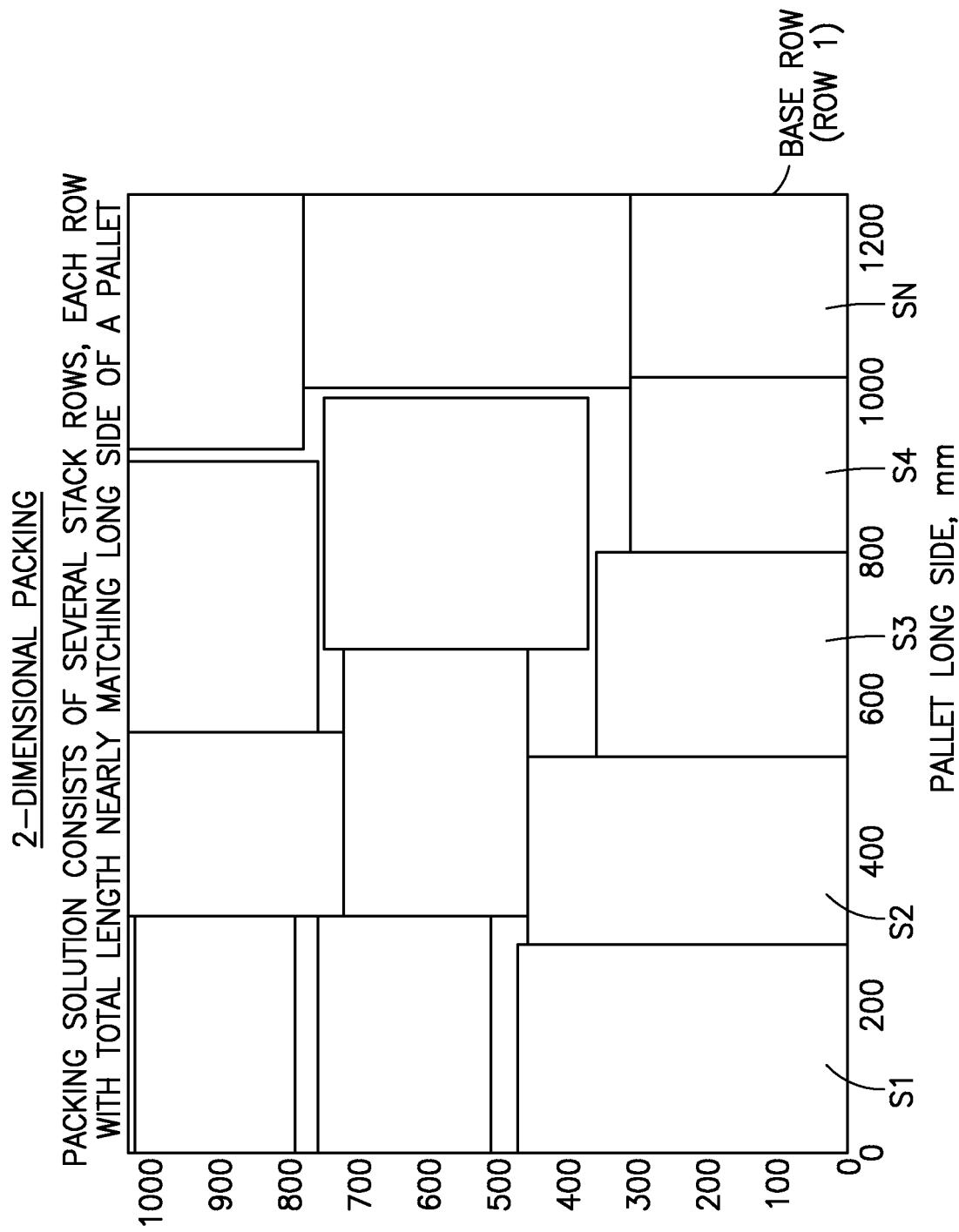
FIG. 3 is a schematic plan view showing a portion of a composite stacked layer of the pallet load of FIG. 1A.
Figure 3A:
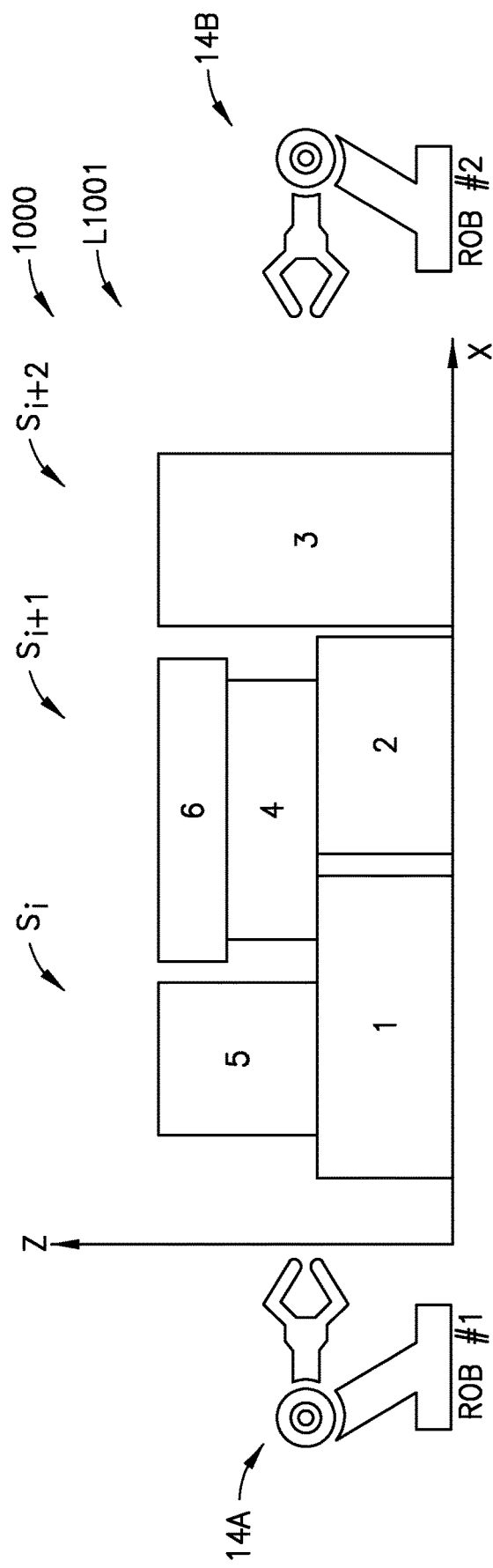
FIG. 3A is a schematic illustration of the palletizer of FIG. 2 with at least a portion of an exemplary pallet layer.

As noted, the fulfillment pallets are highly heterogeneous as illustrated by the case distribution shown in FIG. 1B. FIG. 3 also illustrates a representative pallet layer plan where stacks of one or more case units S1-SN are packed into a respective pallet layer L121-L125, L12T by, for example, the pallet generator 166, 166' in a manner substantially similar to that described in U.S. Pat. No. 8,965,559 (previously incorporated herein by reference in its entirety). FIG. 3A illustrates a representative elevation of one or more stacks S, $S_{i+1}$, $S_{i+2}$, ... $S_{i+n}$ of the layer illustrated in FIG. 3, where $S_{i+1}$, $S_{i+2}$, ... $S_{i+n}$ may correspond to any one or more of the stacks of one or more case units S1-SN. It is noted that FIG. 3 is illustrated in two-dimensions for exemplary purposes but it should be understood that the layer may be three dimensional (see also FIG. 1A), where the sides of the cases units as shown in FIG. 3A in each layer may be the front of the cases, the back of the cases or both the front and the back if they do not define the pallet load edge). Each layer L121-L125, L12T (and each pallet load PAL) may have any suitable number of cases arrayed linearly and vertically. As a further example of the heterogeneity of the pallet load PAL exemplary case dimensions are provided in Table 1 for a pallet layer having six cases is provided below (which six cases correspond to the six cases illustrated in FIG. 3A). It is noted that the case unit identification used in FIG. 3A and Table 1 is arbitrarily assigned and used to discriminate between different mixed cases and not representative of any sequence in any of the figures.

TABLE 1

| CASE ID | LENGTH | WIDTH | HEIGHT | WEIGHT | LAYER ID |
|---|---|---|---|---|---|
| 1 | 352 mm | 425 mm | 312 mm | 15130 g | 1 |
| 2 | 403 mm | 314 mm | 211 mm | 7600 g | 1 |
| 3 | 301 mm | 175 mm | 418 mm | 10024 g | 1 |
| 4 | 344 mm | 329 mm | 137 mm | 5490 g | 1 |
| 5 | 202 mm | 167 mm | 189 mm | 2056 g | 1 |
| 6 | 287 mm | 424 mm | 68 mm | 3277 g | 1 |

It is again noted that the information provided in Table 1 is exemplary in nature and for illustrative purposes only. Again, the layer illustrated in FIGS. 3 and 3A and/or described with respect to Table 1 is a representative layer L121-L125, L12T (or part thereof of a mixed case arrangement plan 184) that is predetermined and similar to the layers in the pallet load PAL illustrated in FIG. 1A.

Decoupling the solving of the placement sequence problem (resolving the manner/sequence in which to place cases to form the mixed case arrangement plan 184) from the case arrangement problem is a further advantage that enables (as described herein) the sequence problem to be solved decoupled from the conditions and constraints (as noted herein) bounding the case arrangement solution. This eases the constraints on the sequencer system enabling generation of both the palletizing sequence (i.e., case delivery sequencer for pallet building robot(s)) and end of arm tool(s) movements (e.g., pallet building robot positions/control, pallet building robot movement path/speed, end of arm tool control for handling cases, etc.), which is/are not limited to any special pallet size, structure of the planned pallet, case size, hardware constraints for the pallet building robot(s) (e.g., number of pallet building robots, pallet build robot model/workspace, robot placement path, end of arm tool design, picking conveyor design, etc.) in contrast to conventional systems which lack such capacity. Further, as described herein, the inventive system is configured to interface the pallet arrangement planner (e.g., the pallet planner control or generator 166, 166' that communicates with the warehouse management system 2500 providing the mixed cases or the fulfillment order, and generates the mixed case arrangement plan 184 therefrom) to the storage and retrieval engine 190 and the automatic palletizer 162 (also referred to herein as palletizing station or palletizing cell), formulating from the mixed case arrangement plan 184 (of the pallet planner/generator 166, 166') an optimal, yet flexible, mixed case sequence solution that is communicated to and is effected by the storage and retrieval engine 190 and palletizer 162.

Referring also to FIG. 2A, the inventive system is referred to herein as a "flexible sequencer" 297 and provides an iterative (or heuristic) approach, that in effect reduces the mixed case arrangement plan 184 of the pallet load PAL (or a portion of the pallet load covering a predetermined part of the area of the pallet—see FIG. 1A) for at least one case, and/or for each case, in at least one layer L121-L125, L12T, and/or each layer L121-L125, L12T, of the pallet load PAL into a sequence that solves the sequence order (e.g., sequences) of the at least one case, and for each case in each layer L121-L125, L12T, to build the pallet load PAL of the mixed case arrangement plan 184. The predetermined arrangement of the mixed case arrangement plan 184 is reduced by at least one of the mixed cases CU case upon characterizing sequence flexibility of the at least one of the mixed cases CU within the case placement sequence solution set. For example, the case placement sequence solution set described herein resolves placement sequence of at least one of the mixed cases CU in the pallet load PAL so as to place the at least one mixed case with at least one pallet building robot 14 building the mixed case arrangement plan 184, and reduces the predetermined arrangement of the mixed case arrangement plan 184 by at least one of the mixed cases substantially unconstrained by one or more of predetermined characteristics defining pallet structure and structure of the mixed cases of the mixed case arrangement plan 184. As described herein, the mixed case arrangement plan 184 is reduced by the cases for the sequence solution that is generated. The sequence solution, is deterministic for building the pallet load PAL to the mixed case arrangement plan 184, but is not rigid having (as part of the sequence solution) flexibilities that may be considered and referred to for descriptive purposes as switches of sequence that correspond to and are permitted for (i.e., permitted switches) one or more mixed cases in the sequence solution (in accordance with one aspect), and for each mixed case relative to one or more other mixed cases in the sequence solution. The sequence flexibility (or switches) for one or more, or any desired number of, or for each, mixed cases of the sequence solution, is determined and part of (in other words embedded in) the generated sequence solution (as described herein) and hence may be effected (switching sequences) by the palletizer 162 (such as due to mis-queue of a corresponding mixed case infed by the storage and retrieval system 100) in substantially real time without having to re-determine the sequence solution (neither in entirety, nor in the remainder sequence solution part from the mis-queued case forwards). The reference to real time is transaction time from pick by the storage and retrieval engine 190 of a representative mixed case (of the sequence solution) from store and infeed of the representative mixed case to the palletizer for building of the pallet load (may be considered also as sequence time).

In accordance with aspects of the present disclosure, the system 100 may be configured to generally include an in-feed section, a storage and sortation section (e.g., storage and retrieval engine 190) and an output section. As will be described in greater detail below, the system 100 operating for example, as a retail distribution center may serve to receive uniform pallet loads of cases, breakdown the pallet goods or disassociate the cases from the uniform pallet loads into independent case units handled individually by the system, retrieve and sort the different cases sought by each order into corresponding groups, and transport and assemble the corresponding groups of cases into what may be referred to as mixed case pallet loads. The in-feed section may generally be capable of resolving the uniform pallet loads to individual cases, and transporting the cases via suitable transport, for input to the storage and sortation section. The storage and sortation section in turn may receive individual cases, store them in a storage area and retrieve desired cases individually in accordance with commands generated in accordance with orders entered into a warehouse management system for transport to the output section. The sorting and grouping of cases according to order may be performed in whole or in part by either the storage and retrieval section or the output section, or both, the boundary between being one of convenience for the description and the sorting and grouping being capable of being performed any number of ways as will be described further below. The intended result is that the output section assembles the appropriate group of ordered cases, that may be different in stock keeping unit (SKU), dimensions, etc. into mixed case pallet loads MPL. In the aspects of the present disclosure, the output section generates the pallet load in what may be referred to as a structured architecture of mixed case stacks. The structured architecture of the pallet load may be characterized as having several flat case layers L121-L125 (see FIG. 1A), at least one of which is formed of non-intersecting, free-standing and stable stacks of multiple mixed cases. The mixed case stacks (see stacks S1-SN in FIG. 3) of the given layer L121-L125, L12T have substantially the same height (see FIG. 1A), to form as may be realized substantially flat top and bottom surfaces of the given layer L121-L125, L12T, and may be sufficient in number to cover the pallet area, or a desired portion of the pallet area.

The automated storage and retrieval system may be generally described as a storage and retrieval engine 190 coupled to a palletizer 162. In greater detail now, and with reference still to FIG. 2, the storage and retrieval system 100 may be configured for installation in, for example, existing warehouse structures or adapted to new warehouse structures. As noted before the system 100 shown in FIG. 2 is representative and may include for example, in-feed and out-feed conveyors terminating on respective transfer stations 170, 160, lift module(s) 150A, 150B, a storage structure 130, and a number of autonomous vehicular transport robots 110 (referred to herein as "bots"). It is noted that the storage and retrieval engine 190 is formed at least by the storage structure 130 and the bots 110 (and in some aspect the lift modules 150A, 150B; however in other aspects the lift modules 150A, 150B may form vertical sequencers in addition to the storage and retrieval engine 190 as noted below). In alternate aspects, the storage and retrieval system may also include robot or bot transfer stations (not shown) that may provide an interface between the bots 110 and the lift module(s) 150A, 150B. The storage structure 130 may include multiple levels of storage rack modules where each level includes respective picking aisles 130A, and transfer decks 130B for transferring case units between any of the storage areas of the storage structure 130 and a shelf of the lift module(s) 150A, 150B. The picking aisles 130A, and transfer decks 130B also allow the bots 110 to place case units into picking stock and to retrieve ordered case units. In alternate aspects, each level may also include respective bot transfer stations 140. The bots 110 may be configured to place case units, such as the above described retail merchandise, into picking stock in the one or more levels of the storage structure 130 and then selectively retrieve ordered case units for shipping the ordered case units to, for example, a store or other suitable location. The in-feed transfer stations 170 and out-feed transfer stations 160 may operate together with their respective lift module(s) 150A, 150B for bi-directionally transferring case units CU to and from one or more levels of the storage structure 130. It is noted that while the lift modules 150A, 150B may be described as being dedicated inbound lift modules 150A and outbound lift modules 150B, in alternate aspects each of the lift modules 150A, 150B may be used for both inbound and outbound transfer of case units/case units from the storage and retrieval system 100.

As may be realized, the storage and retrieval system 100 may include multiple in-feed and out-feed lift modules 150A, 150B that are accessible by, for example, bots 110 of the storage and retrieval system 100 so that one or more case unit(s), uncontained (e.g. case unit(s) are not held in trays), or contained (within a tray or tote) can be transferred from a lift module 150A, 150B to each storage space on a respective level and from each storage space to any one of the lift modules 150A, 150B on a respective level. The bots 110 may be configured to transfer the case units between the storage spaces and the lift modules 150A, 150B. Generally, the lift modules 150A, 150B include at least one movable payload support that may move the case unit(s) between the in-feed and out-feed transfer stations 160, 170 and the respective level of the storage space where the case unit(s) is stored and retrieved. The lift module(s) may have any suitable configuration, such as for example, reciprocating lift, or any other suitable configuration. The lift module(s) 150A, 150B include any suitable controller (such as controller 120 or other suitable controller coupled to controller 120, warehouse management system 2500, and/or palletizer controller 164) and may form a sequencer or sorter in a manner similar to that described in U.S. patent application Ser. No. 16/444,592 filed on Jun. 18, 2019 and titled "Vertical Sequencer for Product Order Fulfillment" (the disclosure of which is incorporated herein by reference in its entirety) that sequences the mixed cases CU according to the predetermined mixed case sequence solution, the predetermined mixed case sequence solution being generated as described herein for the palletizer 162 to build the pallet load PAL.

The automated storage and retrieval system may include a control system, comprising for example, one or more control servers 120 that are communicably connected to the in-feed and out-feed conveyors and transfer stations 170, 160, the lift modules 150A, 150B, and the bots 110 via a suitable communication and control network 180. The communication and control network 180 may have any suitable architecture which, for example, may incorporate various programmable logic controllers (PLC) such as for commanding the operations of the in-feed and out-feed conveyors and transfer stations 170, 160, the lift modules 150A, 150B, and other suitable system automation. The control server 120 may include high level programming that effects a case management system (CMS) 120 managing the case flow system. The network 180 may further include suitable communication for effecting a bi-directional interface with the bots 110. For example, the bots 110 may include an on-board processor/controller 1220. The network 180 may include a suitable bi-directional communication suite enabling the bot controller 1220 to request or receive commands from the control server 180 for effecting desired transport (e.g. placing into storage locations or retrieving from storage locations) of case units and to send desired bot 110 information and data including bot 110 ephemeris, status and other desired data, to the control server 120. As seen in FIG. 2, the control server 120 may be further connected to a warehouse management system 2500 for providing, for example, inventory management, and customer order fulfillment information to the CMS 120 level program. A suitable example of an automated storage and retrieval system arranged for holding and storing case units is described in U.S. Pat. No. 9,096,375, issued on Aug. 4, 2015 the disclosure of which is incorporated by reference herein in its entirety. Other suitable examples of automated storage and retrieval systems (ASRS) for storing and handling case units as described above and as otherwise shown in FIG. 2, to the extent applicable include the Multishuttle® System from Dematic Corp. and the Autostore™ system from Swisslog and ASRS systems from SSI Schaeffer.

Referring still to FIG. 2, in the aspects of the present disclosure the out-feed section of system 100, and more specifically out-feed transfer station and conveyors 160 extending therefrom serve to transport case units retrieved from storage to palletizer 162. The interface (not shown) between the out-feed section conveyors and palletizer 162 may have any desired configuration that facilitates substantially unimposed (with respect to output of the system out-feed section) arrival of ordered case units, and placement for unconstrained picking of the case units by the palletizer for building the mixed case pallet load PAL. A palletizer controller 164 is provided to control operation of the palletizer 162. In the aspects of the present disclosure shown, the palletizer controller 164 may be a separate control server or processor (e.g. a PC) that may be communicably linked over a suitable network (e.g. network 180 or a different network) for bi-directional communication with the control server 120, and more specifically the CMS level programming of the control server 120. FIG. 2 further illustrates the case wherein a palletizer control 164' may be integrated into the system control server 120. Accordingly, as may be realized, the control level programming (effecting commands for palletizer operation) as well as higher level palletizer programming, such as with a pallet load generator 166, 166' that may be resident on a common processing platform as the control servers 120 or a remote platform palletizer controller 164 as desired. As may be further realized, the palletizer controller 164, 164' may interface with the CMS program of the control server 120 for information on respective orders and case units used for example, by the pallet generator in generating the pallet loads corresponding to the respective order. For example, information sought and provided by the CMS program to the palletizer control 164, 164' may include identification information for the respective orders to be filled, the sequence the orders are to be completed, the identification information (e.g. SKUs) of corresponding cases (e.g. which ones and how many) for the respective order, queuing information of cases initialized for retrieval and transport to the palletizer and changes thereto to the extent applicable dimensional data of the respective case and any other desired information.

The out-feed section of the system 100 may include one or more inspection and/or dimensioning stations (not shown) where for example, identity of cases corresponding to respective order may be confirmed, case dimensions (in 3-D) may be confirmed as well as case integrity and suitability for palletization. Such inspection station may be distributed within the out-feed section, or may be substantially a single station for example, along the transport path of the out-feed section, or for example, positioned proximate or adjacent the palletizer. Information from the inspection station may be communicated to the CMS program, such as for conformance confirmation of cases for a respective order, and resolution of any non-conformances. As noted before, such case information is further shared or transmitted to the palletizer controller 164 for use by the pallet load generator level program as well as programs governing palletizer motor control. If desired, the flexible sequencer 297 may be communicably connected to the warehouse management system 2500 or any other portion of the storage and retrieval system 100 for interface and transfer of desired information. For example, in one aspect and referring also to FIG. 5, the palletizer controller 164, 164' is connected to the flexible sequencer 297, where the flexible sequencer 297 is configured to generate an input queue feed sequence 444 of mixed cases output from the storage. The flexible sequencer 297 is also configured to communicate at least part of a sequence solution from the case placement sequence solution set(s) 500 to the case infeed 183 so as to provide the input queue feed sequence 444 of mixed cases CU, including the at least one of the mixed case CU. The palletizer controller 164, 164' commands movement of the pallet building robot(s) 14 to pick and place cases for building a pallet load PAL with substantially continuous case placement action of the palletizer 162 as will be further described herein. In other aspects of the present disclosure, inspection stations as noted above may be provided in the infeed section, or the case unit information identified thereby generated by any other suitable means and provided to the CMS program.

Figure 4:
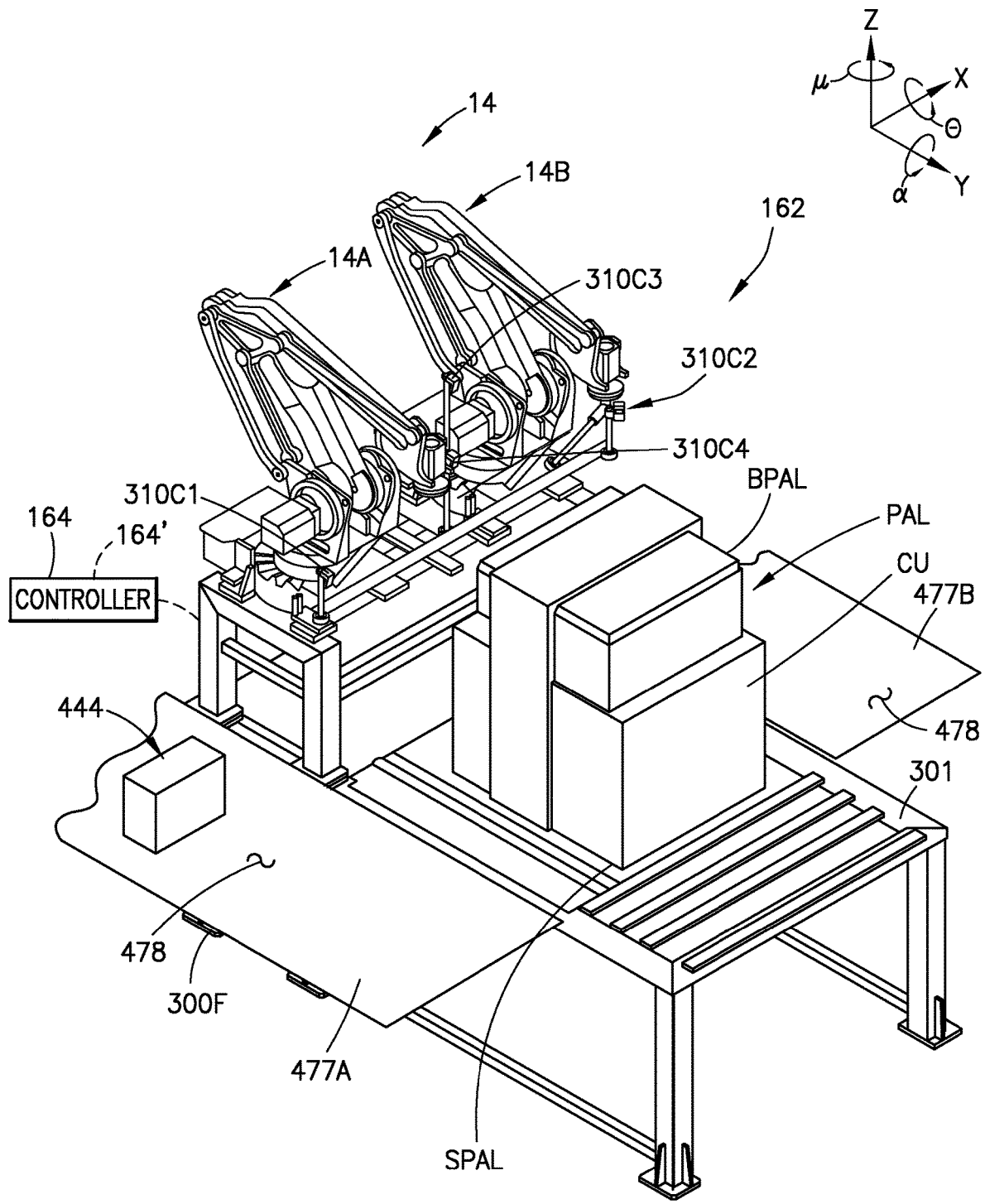
FIG. 4 is a schematic illustration of a palletizer of the automated material handling system of FIG. 2 in accordance with aspects of the present disclosure.

The storage and retrieval engine 190 transports the mixed cases CU to the lift module(s)/sorter(s) 150A, 150B so that the lift module(s) 150A, 150B pick and deliver the mixed cases CU and infeeds the mixed cases CU to the palletizer 162. Referring to FIGS. 2 and 4, each palletizer 162 (also referred to as a palletizer cell or station) generally includes a case infeed 183, a frame 300F, at least one pallet building robot 14, a controller 164, 164'. In one aspect, the palletizer 162 also includes a vision system having at least one three-dimensional, time of flight, camera 310C1, 310C2, 310C3, 310C4. A suitable example of a palletizer 162 is described in U.S. patent application Ser. No. 16/035,204 filed on Jul. 13, 2018 and titled "Apparatus and Method for Building a Pallet Load", the disclosure of which is incorporated herein by reference in its entirety.

The case infeed 183 feeds mixed cases CU to the palletizer 162 so as to provide an input queue feed sequence 444 of mixed cases CU to the palletizer 162. The frame 300F defines a pallet building base 301 for the pallet support SPAL. The at least one pallet building robot 14 is connected to the frame 300F. The at least one pallet building robot 14 is communicably connected to the case infeed 183 to access and pick cases from the input queue of the case infeed 183 and configured to receive the mixed cases CU in the input queue feed sequence 444 of mixed cases CU. The pallet building robot 14 being configured to place the mixed cases CU according to and dependent on the input queue feed sequence 444 of mixed cases CU so as to effect building the mixed case pallet PAL at a predetermined substantially steady placement rate. The at least one pallet building robot 14 is configured so as to transport and place the pallet load article units (also referred to as mixed cases) CU serially onto the pallet support SPAL so as to build the pallet load PAL (see Fig. A) on the pallet building base 301.

The palletizer control 164, 164' is operably connected to the case infeed 183 and at least one pallet building robot 14 and is configured (with any suitable hardware and non-transient computer program code) to control articulated robot motion, relative to the pallet building base 301, and effect therewith a pallet load build BPAL of the pallet load PAL. The palletizer control 164, 164' is configured so as to generate a complete and stable mixed case arrangement plan 184 that completes at least a predetermined whole part of the mixed case pallet PAL and that describes a predetermined planned location and pose for each case of the complete and stable mixed case arrangement plan 184 of the predetermined whole part of the mixed case pallet PAL. As will be described in greater detail herein, the palletizer control 164, 164' (or any suitable the pallet building robot 14A, 14B controller) is configured to build the pallet PAL corresponding to the complete and stable mixed case arrangement plan 184 from the case placement sequence generated by the flexible sequencer 297, wherein each sequence solution by the flexible sequencer 297 sequences placement of the mixed cases CU building the mixed case pallet PAL, and wherein the solution set resolves building, with the at least one pallet building robot(s) 14, the mixed case pallet PAL based on the complete and stable mixed case arrangement plan 184. As noted from above, the mixed case arrangement plan 184 presents a n-p hard problem sequencing the mixed cases CU building the mixed case pallet PAL. In one aspect, the flexible sequencer 297 is configured so that generation of the case placement sequence solution set is substantially unconstrained by the one or more of the predetermined characteristics (as described herein) defining pallet structure, and the structure of the mixed cases of the complete and stable mixed case pallet structure.

The case placement sequence solution set characterizes sequence flexibility in a placement sequence of the mixed cases CU building the mixed case pallet PAL with the at least one pallet building robot 14. As described herein, characterizing the sequence flexibility identifies one or more of the mixed cases CU in the complete and stable mixed case arrangement plan 184 that have a predetermined characteristic. The predetermined characteristic determines that at least one of the one or more of the mixed cases is sequenced independent relative to the at least part of the sequence solution. In one aspect, the predetermined characteristic is positional independence of each of the mixed cases relative to an adjoining case in the complete and stable mixed case arrangement plan 184. The positional independence is determined from the case placement sequence solution set generated for at least one the mixed cases.

As will also be described in greater detail herein, the flexible sequencer 297 is configured to communicate at least part of a sequence solution from the case placement sequence solution set to the storage and retrieval engine 190. The flexible sequencer 297 communicates with and feeds with case infeed 183 so as to provide the input queue feed sequence 444 of mixed cases CU. It is noted that any suitable portion or portions of the storage and retrieval engine 190 located upstream of the palletizer 162 are referred to herein collectively for convenience and ease of understanding as case infeed 183. The flexible sequencer 297 is also configured to communicate the sequence flexibility to the controller 164, 164' of each of the at least one pallet building robot(s) 14 to resolve a mis-queue in the respective input queue feed sequence 444 (for a given pallet building robot 14A, 14B) of mixed cases CU so that the pallet building robot case placement of the palletizer 162 (with at least one pallet building robot(s) 14) is substantially continuous building the mixed case pallet PAL at the predetermined substantially steady placement rate.

Still referring to FIG. 4, in one aspect, the palletizer 162 includes a dual (i.e., two) pallet building robots 14A (e.g., Robot #1), 14B (e.g., Robot #2) (generally referred to as robot(s) 14); however, in other aspects there may be any suitable number of pallet building robots. The pallet building robots 14 are illustrated as six degree of freedom (X, Y, Z, θ, α, μ) robots for exemplary purposes only; however, in other aspects the pallet building robot(s) 14 may have any suitable configuration, such as an articulated arm with more or less than six degrees of freedom, as a Cartesian robot, and/or as a selective compliant robot arm with an end of arm tool. Each of the pallet building robots 14 pick from respective sides of the palletizer station 162. For example, each respective side of the palletizer station 162 has a predetermined pick location/station 477A, 477B from which the respective pallet building robot 14A, 14B picks the mixed case units CU (i.e., pallet building robot 14A picks from pick location 477A while pallet building robot 14B picks from pick location 477B). The palletizer station 162 has a minimized or compact size where a size of the predetermined pick location/station 477A, 477B is minimized (to be substantially commensurate with case pick size of one pick). For example, a size/area 478 of the predetermined pick location/station 477A, 477B accommodates but a single pick of a desired size, such as the largest expected case CU (the size/area of the station is only marginally larger than the largest expected case CU to provide for minimized clearance of the case CU to move along/on the pick station 477A, 477B and for picking of the case CU by the respective pallet building robot 14A, 14B); or if the single pick is of a pickface having multiple cases, the size/area of the predetermined pick location/station conforms to the size of the multiple cases (the size/area of the station is only marginally larger than the multiple cases to provide for minimized clearance of the multiple cases to move along/on the pick station 477A, 477B and for picking of the multiple cases by the respective pallet building robot 14A, 14B).

Referring again to FIGS. 2, 2A, and 4, the features of the flexible sequencer 297 described herein eliminate (or enables elimination) of sequencing/resequencing of the mixed cases CU with the pallet building robot 14 between pallet station infeed (e.g., from pick and deliver by the lift module(s)/sorter(s) 150A, 150B) and placing of the mixed cases CU by the pallet building robot 14A, 14B in the pallet load PAL according to the sequence solution. As noted herein, the inventive flexible sequencer 297 effectively decouples both determination of a physical production of the sequence solution from buffers at the palletizer station 162, so that buffers may be eliminated (e.g., at least for the purpose of effecting sequencing/resorting at the palletizer station 162) or minimized (such as to hold a next mixed case in the sequence order according to the sequence solution, to feed to the predetermined pick station 477A, 477B coincident with the pallet building robot 14A, 14B building effecting pick/place motion of the present case CU (i.e., the case actively being picked by the pallet building robot 14 for placement on the pallet), in accordance with the sequence solution (or flexibility) as will be described further herein.

Accordingly the mixed cases CU of the fulfillment order, are fed to the predetermined pick station 477A, 477B in order of the predetermined sequence solution, and just in time to maintain a substantially continuous pick/place motion of the pallet building robot(s) 14A, 14B at an optimum rate to build the pallet load PAL in a continuous optimum manner, and provide for a minimum/compact size palletizer station 162. As will be evident from further description below, sorting of the mixed cases CU in order of the sequence solution is performed by the storage and retrieval engine 190, so that sorting is substantially completed by the storage and retrieval engine 190. Cases are infed (the mixed cases are transferred from pick and delivery by the lift module(s)/sorter(s) 150A, 150B to the palletizer station 162) and sequenced according to the sequence solution, in sequence time consistent with the substantially continuous pallet building. Thus, decoupling from buffers and sequencing/resequencing at the palletizer (of conventional palletizer(s)) advantageously enables real time response to sequencing anomalies/misqueues of in sequencing mixed cases by the storage and retrieval engine 190. The sequence flexibility serves to maintain a substantially constant pallet build at the optimum rate and provides for a compact palletizer station 162 (for any desired pallet building robot 14 configuration with any desired number of pallet building robots 14). The aspects of the inventive flexible sequencer 297 further accommodates a transient decrease in the number of pallet building robots 14 (such as transitioning from two robots 14A, 14B to one robot (e.g., robot 14A or robot 14B) such as where one of the robots 14A, 14B becomes unavailable) during pallet building.

Referring again to FIGS. 1A, 2, and 2A, fill (e.g., customer) orders are received by the warehouse management system 2500. The pallet generator 166, 166' generates the pallet arrangement plan 184 (e.g., pallet load structure) based on mixed case characteristics, conditions, and constraints of the pallet and/or customer (e.g., pallet size, sequence location of cases by fulfillment conditions, stratification of cases, etc.) provided by the warehouse management system 2500. The pallet arrangement plan 184 may be any suitable plan such as that described in U.S. Pat. No. 8,965,559 (previously incorporated herein by reference in its entirety); however, any suitable pallet arrangement plan 184 may be employed. It is noted that the pallet arrangement plan 184 describes a valid location and pose for each mixed case CU in the pallet load PAL and each case CU has a valid location and pose on the mixed case layer L121-L125, L12T of the pallet arrangement plan 184. The pallet arrangement plan 184, as noted herein, is for highly heterogeneous mixed cases CU and is not the same as the sequence of cases CU at the pallet building robot 14 resolved from the pallet arrangement plan 184 by the flexible sequencer 297. In one aspect, the sequencing of cases CU with the storage and retrieval engine 190 may be similar to that described in U.S. Pat. No. 10,377,585 issued on Aug. 13, 2019 and titled "Storage and Retrieval System Transport Vehicle", U.S. Pat. No. 9,884,719 issued on Feb. 6, 2018 and titled "Storage and Retrieval System", U.S. patent application Ser. No. 14/997,892 filed on Jan. 18, 2016 and titled "Storage and Retrieval System", U.S. Pat. No. 10,214,355 issued on Feb. 26, 2019 and titled "Storage and Retrieval System", U.S. Pat. No. 10,102,496 issued Oct. 16, 2018 and titled "Storage and Retrieval System", and/or U.S. patent application Ser. No. 16/444,592 filed on Jun. 18, 2109 and titled "Vertical Sequencer for Product Order Fulfillment" the disclosures of which are incorporated herein by reference in their entireties.

Figure 5:
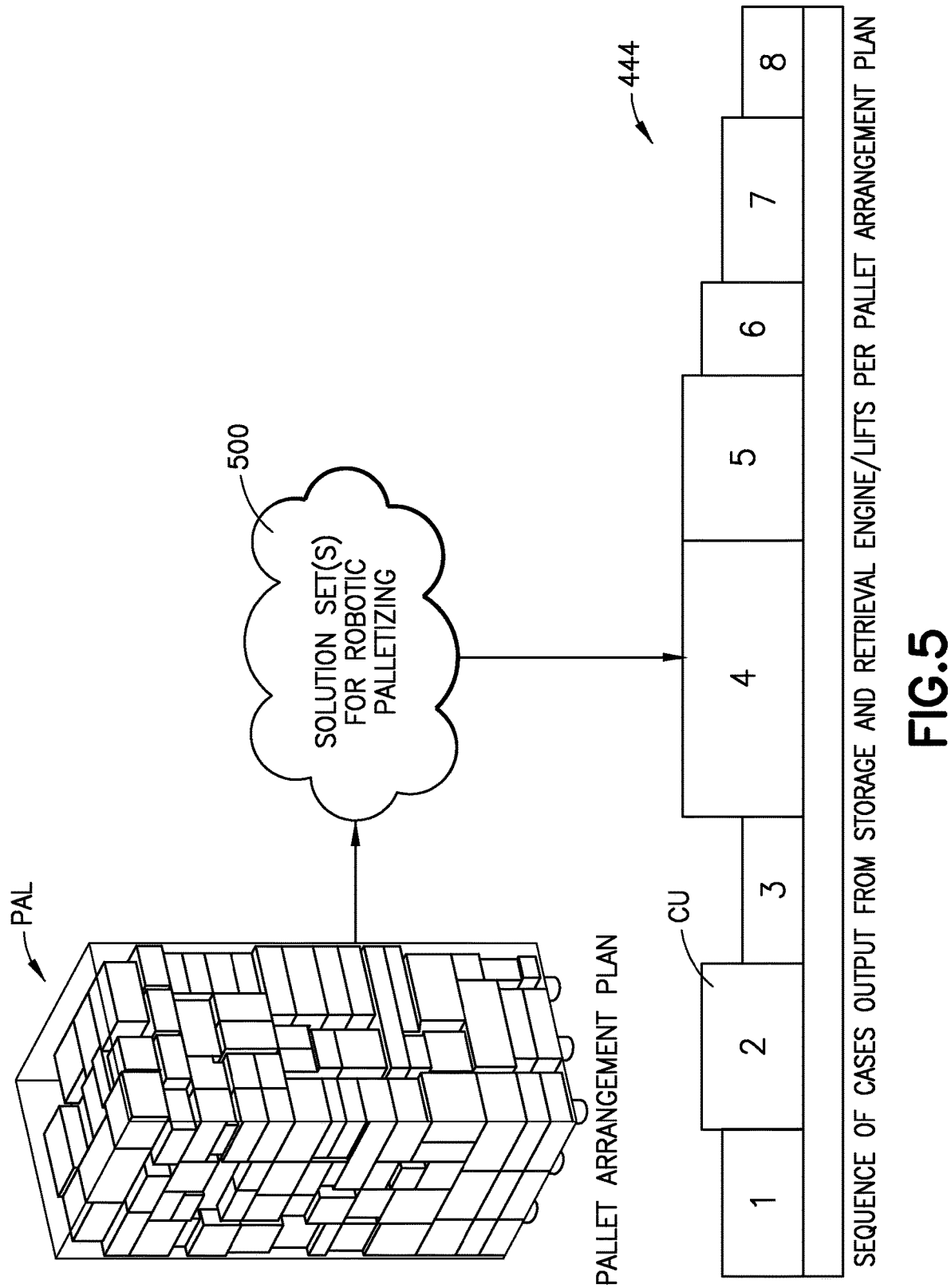
FIG. 5 is a schematic high level illustration of a palletizer case placement sequence solution set determination in accordance with aspects of the present disclosure.
Figure 6:
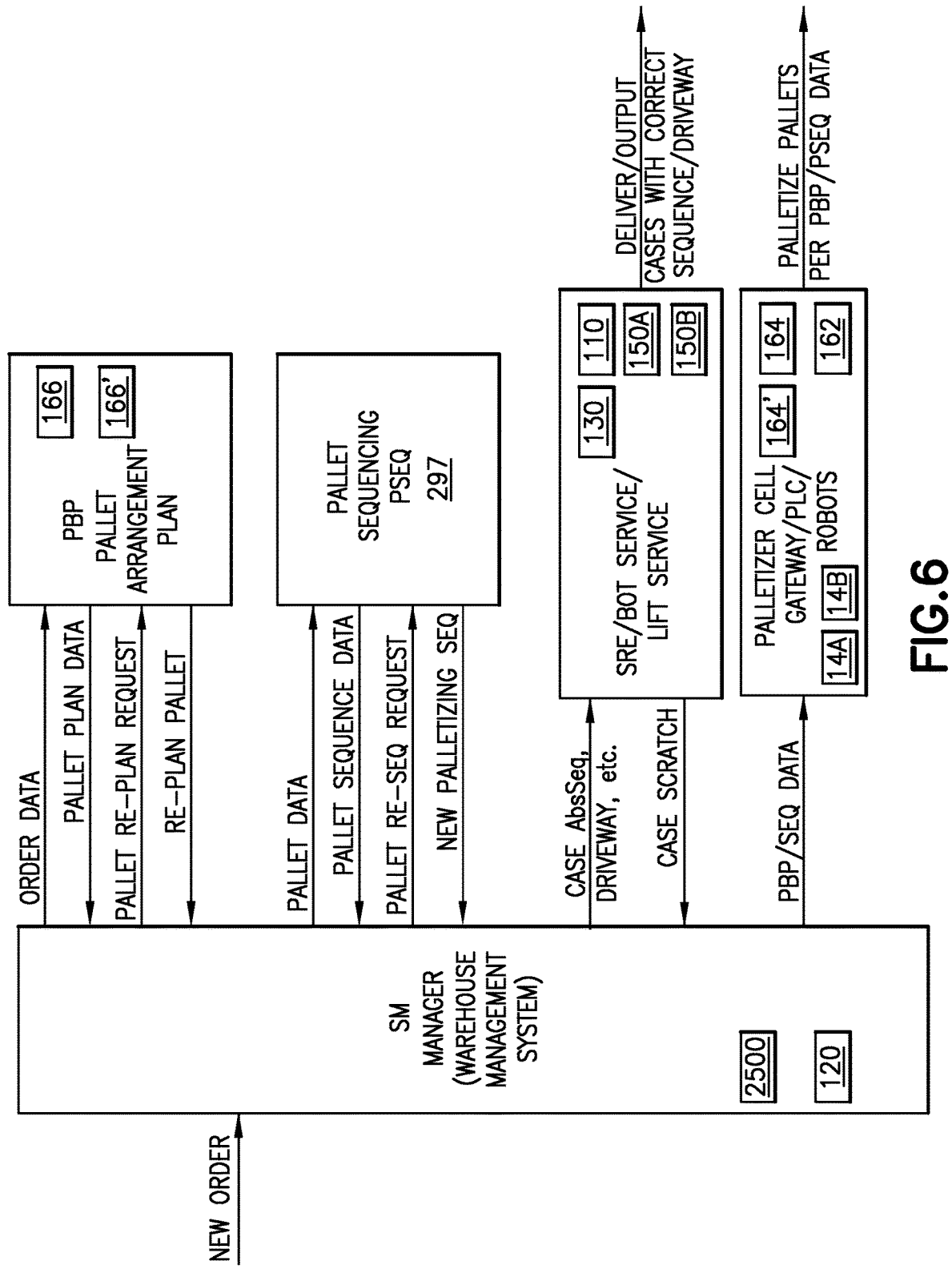
FIG. 6 is an exemplary data flow diagram for order planning and fulfillment process of the automated material handling system of FIG. 2 in accordance with aspects of the present disclosure.

Referring to FIGS. 2, 2A, 5, and 6, as noted herein the pallet arrangement plan 184 arranges the pallet load PAL in layers L121-L125, L12T (see FIGS. 1A and 5) and the flexible sequencer 297 operates, in one aspect, to resolve the sequence solution (and provide a sequence solution set 500 where case units CU identified as 1-8 in FIG. 5 represent cases in the a solution set, again noting the numerical identifiers are arbitrarily assigned (and do not necessarily correspond to the case numerical identifiers in FIG. 3A) and used to discriminate between different mixed cases representative of an exemplary sequence of an exemplary sequence solution for any of the figures) for each layer L121-L125, L12T separately (the layer(s) configuration is to be superposed in the pallet build, and may have substantially flat seat surfaces formed of the mixed case arrangement of the given layer so as to support upper portions of superior layers) and thus, the sequence of cases of each such layer L121-L125 may be resolved independently from layers L121-L125, L12T above and/or below. In other aspects, the flexible sequencer may resolve the sequence for a whole pallet arrangement plan 184 as a unit from a top (or some desired intermediate pallet height) to a bottom of the pallet load PAL in a manner substantially similar to the process described below for the sequence solution of a given layer L121-L125, L12T.

Figure 7:
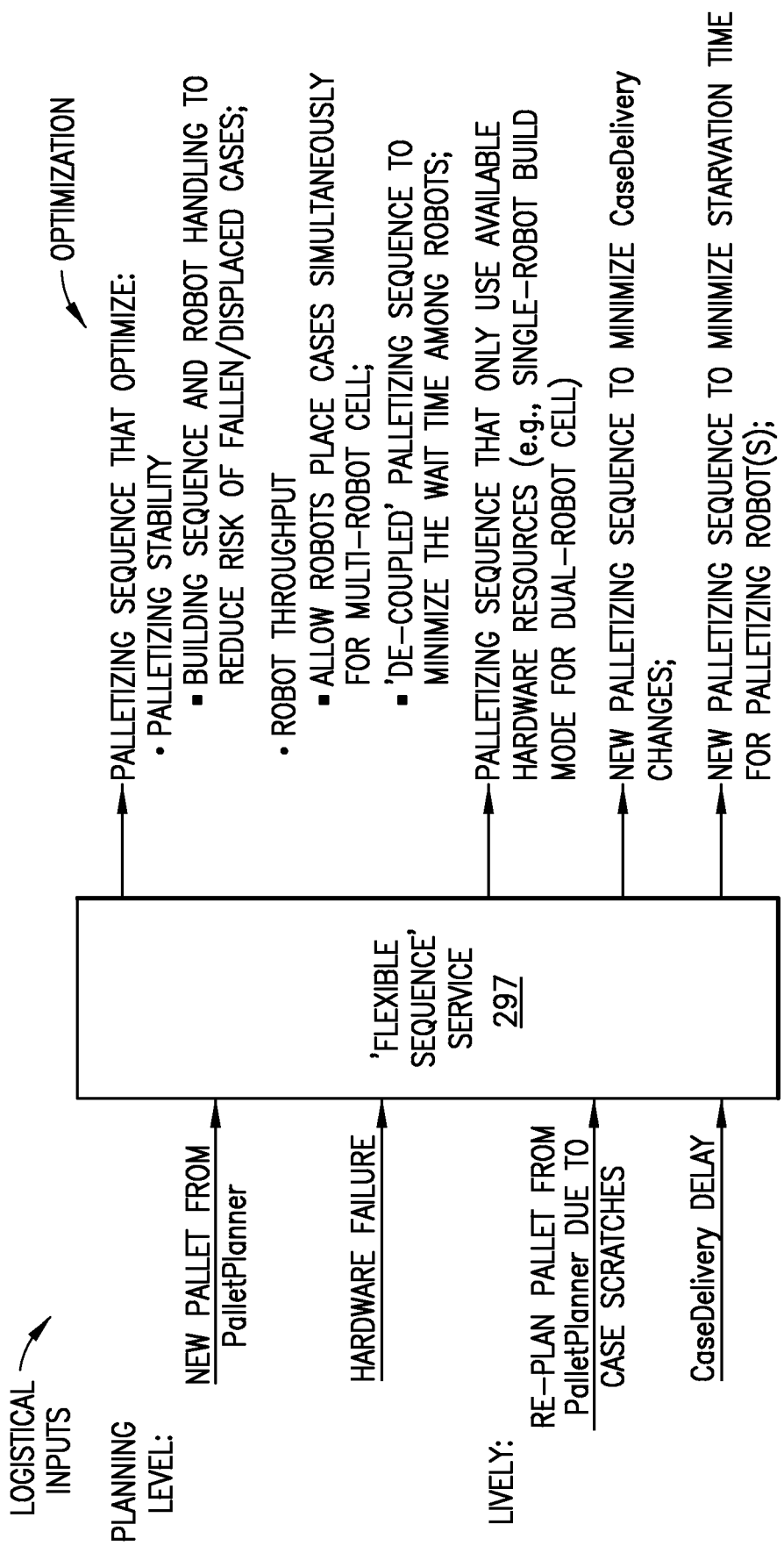
FIG. 7 is an exemplary high level illustration of a flexible sequencer of the automated material handling system of FIG. 2 in accordance with aspects of the present disclosure.

The flexible sequencer 297, shown schematically in FIGS. 2, 2A, and 7, includes any suitable processor and programming to generate the sequence solution as will be described herein, and may be one or more separate modules incorporated into any suitable higher level controllers of the automated storage and retrieval system 100 that interface on the one hand with warehouse management system 2500 and pallet generator 166, 166' and on the other hand with any suitable controller control system of the storage and retrieval engine 190 (e.g., such as bot controllers 1220, lift controllers, etc.) and/or automated palletizer 162 (e.g., such as palletizer controller 164, 164'), or in other aspects, communicably linked (e.g., in any suitable manner such as through wired or wireless connections) to, e.g., control server 120 and/or warehouse management system 2500 and to controllers of the storage and retrieval engine 190 components and palletizer 162 components (e.g., pick stations, pallet building bots 110, etc.) so as to inform respective controllers of the sequence solution generated and receive feedback information regarding sequencing anomalies (e.g., misqueues, case scratches/missing or mispicked cases) or hardware/component availability.

Figure 8:
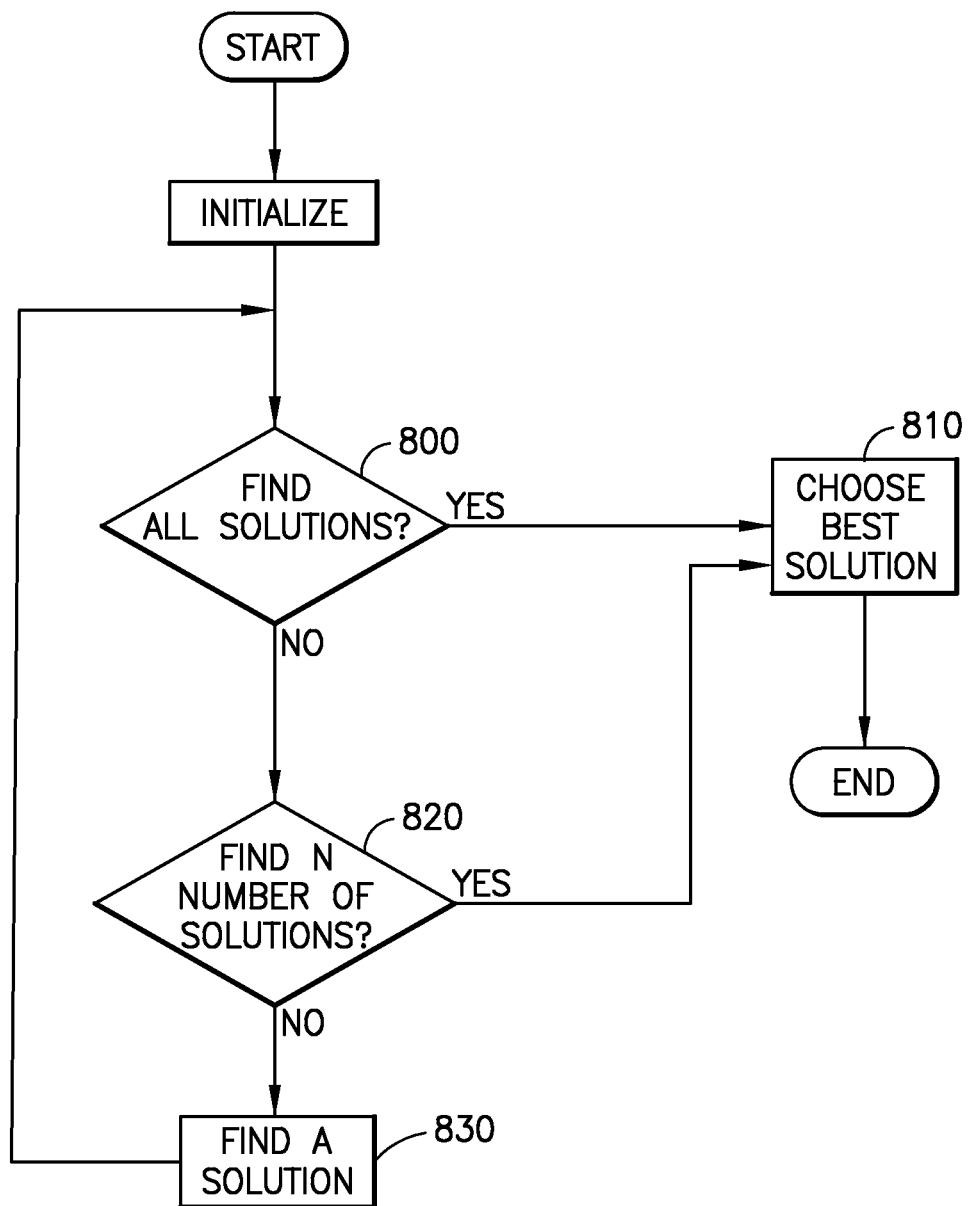
FIG. 8 is an exemplary flow diagram for flexible sequencing of cases in the automated material handling system of FIG. 2 in accordance with aspects of the present disclosure.

As noted before, the pallet arrangement plan 184 presents (e.g., describes) a valid location and pose for each mixed case in each pallet load layer within the boundary constraints (e.g., pallet load top, sides, etc.). The flexible sequencer 297 resolves the sequence solution as schematically shown in FIG. 8. For example, referring to FIGS. 1A, 2A, 7 and 8, the flexible sequencer 297 receives logistical inputs (such as those shown in FIG. 7) from any suitable controller of the automated storage and retrieval system 100, including but not limited to, the warehouse management system 2500, the control server 120, bot controllers 1200, controllers of the lifts 150A, 150B, and the palletizer control 164. The flexible sequencer 297 optimizes palletizing sequences (as shown in FIG. 7) where the flexible sequencer 297 finds all solutions (FIG. 8, Block 800) (e.g., within a time out number N of solutions) for placing case units CU to a given layer L121-L125, L12T of the pallet load PAL. If all solutions are found the flexible sequencer 267 chooses the best solution (FIG. 8, Block 810) (as described herein). If not all solutions are found, the flexible sequencer 297 continues to find solutions until all solutions or N number of solutions (FIG. 8, Block 820) are found (which in one example is about 3000 solutions for illustrative purposes only). If N number of solutions are not found the flexible sequencer 297 continues to find solutions (FIG. 8, Block 830) until all solutions are found and then chooses the best solution (FIG. 8, Block 810).

Figure 9B:
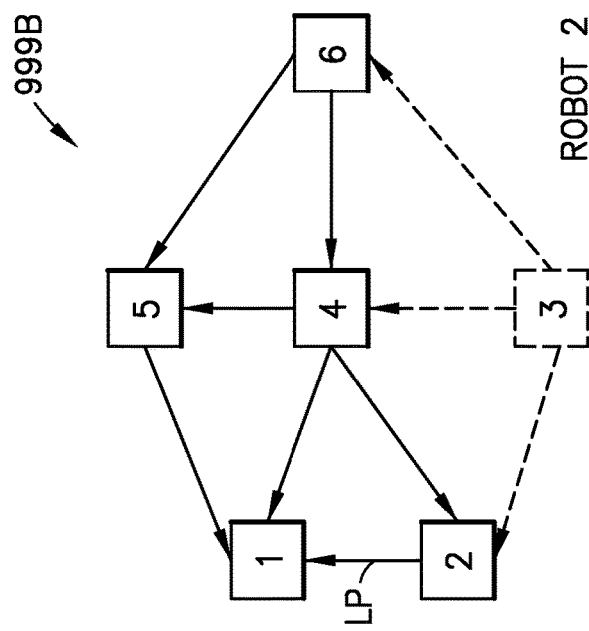
FIGS. 9A and 9B are exemplary flexible sequence matrices generated by the flexible sequencer of FIG. 7 in accordance with aspects of the present disclosure.
Figure 9C:
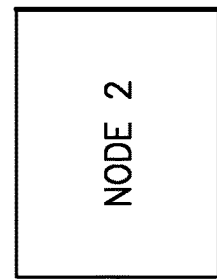
FIG. 9C is a portion of a flexible sequence matrix, such as shown in FIGS. 9A and 9B, in accordance with aspects of the present disclosure.
Figure 9A:
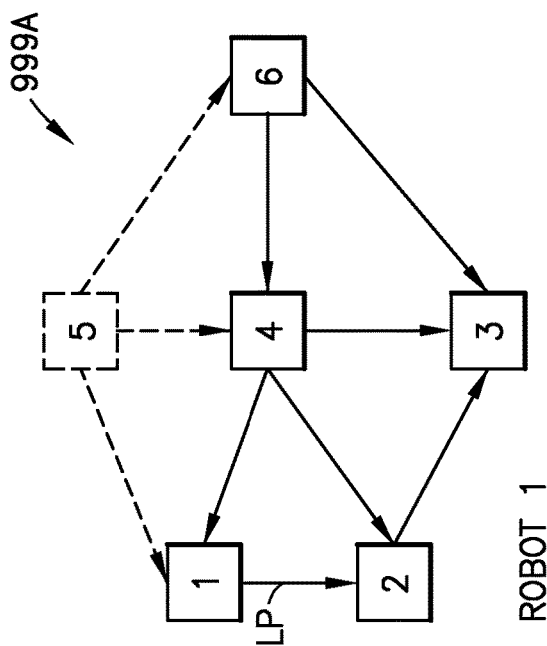
Figure 10C:
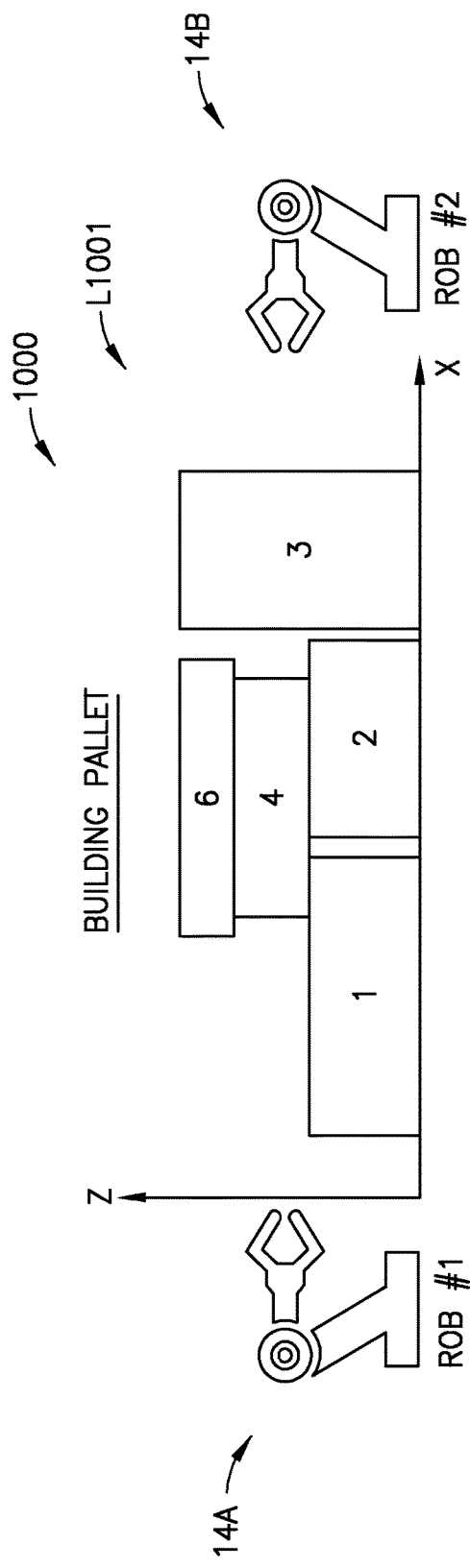
Figure 10D:
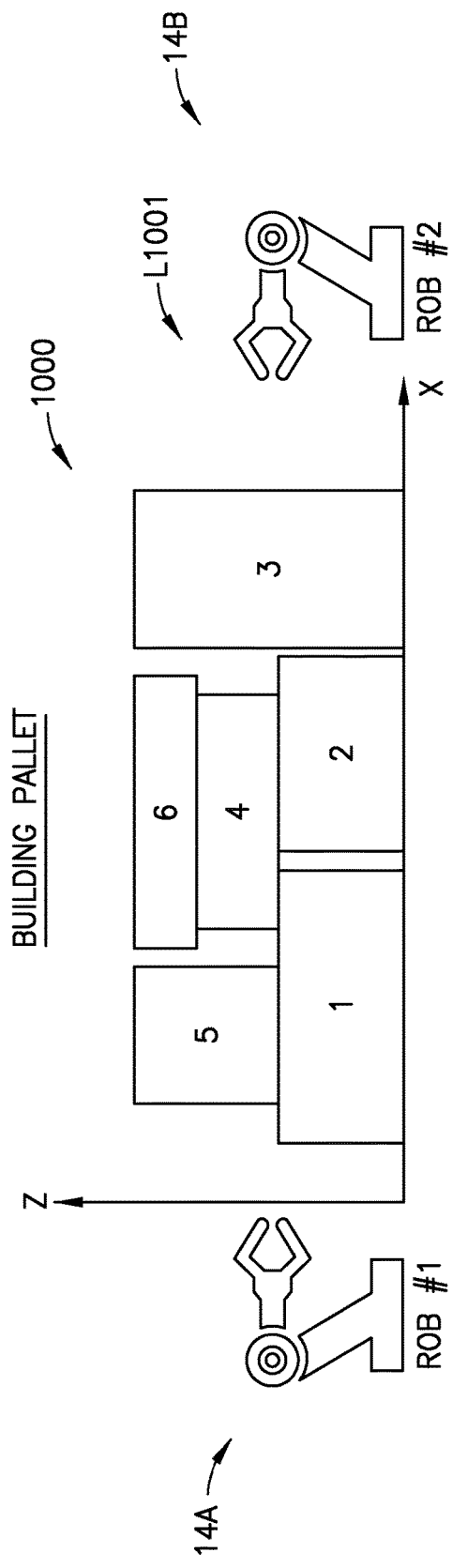
Figure 11:
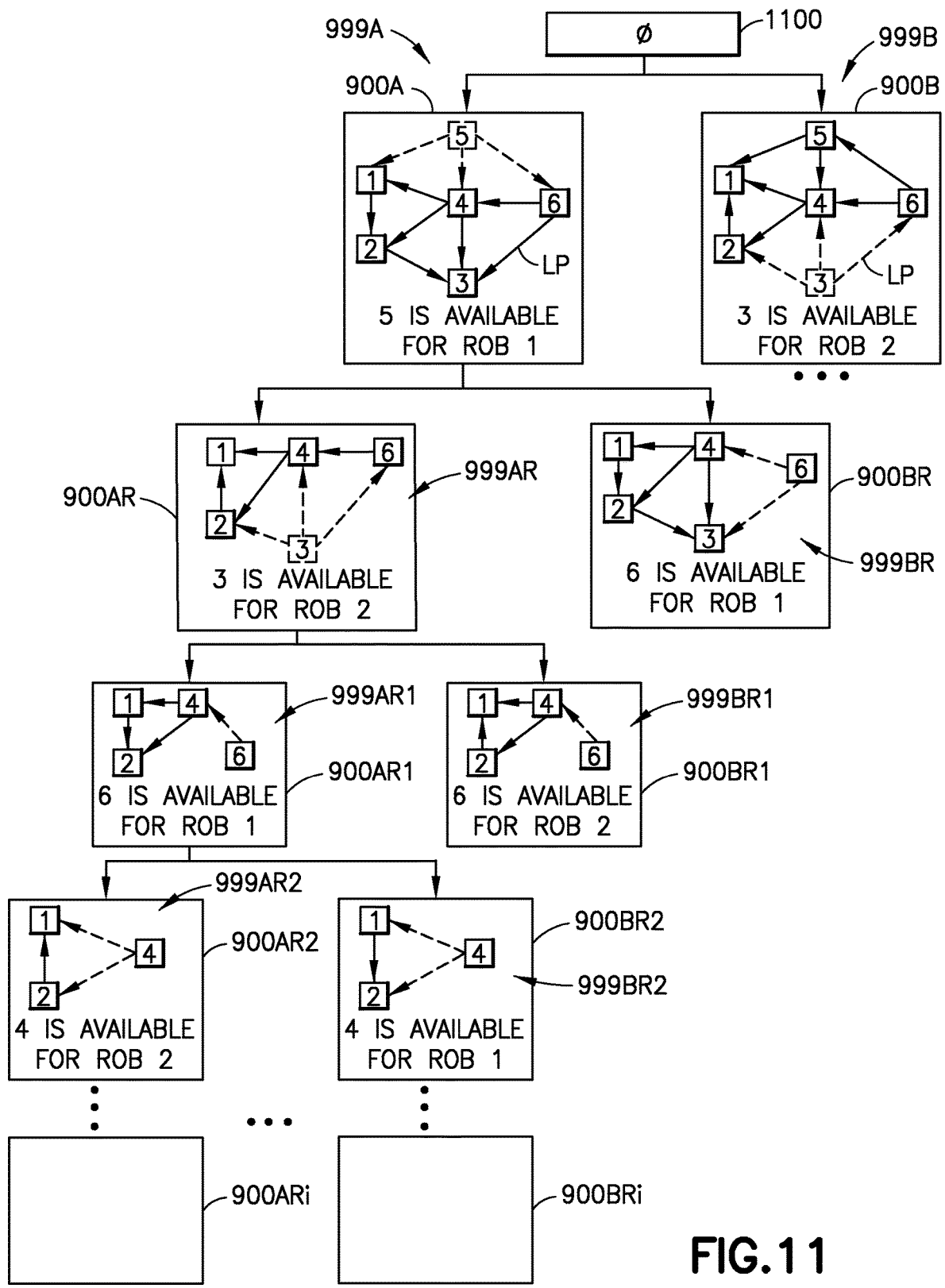
FIG. 11 is a schematic example of a representative sequence solution set (or at least a portion thereof) generated by the flexible sequencer of FIG. 7 in accordance with aspects of the present disclosure.

Generally, and in accordance with methods for resolving n-p hard problems, the flexible sequencer 297 is programmed to investigate heuristically and maps the interdependencies of mixed cases (and conversely independence of such cases) of the pallet arrangement plan layers L121-L125, L12T (see, e.g., FIGS. 3B, 9A, and 9B). Each layer L121-L125, L12T of the pallet arrangement plan 184 may be treated as a matrix of nodes (representative of cases—again, see e.g. FIGS. 9A and 9B) according to the pallet arrangement plan 184, hardware configurations and constraints, and investigated heuristically with a graph search (e.g., depth first search) method. The flexible sequencer 297 generates sets of interdependent (linkage) paths LP (see, e.g., FIGS. 9A, 9B, and 9C, the arrows between nodes representing the paths LP) for each case CU, that represent and map out sequence solution sets (one example of a solution set is illustrated in FIG. 11 and will be described below). In one aspect, generating the case placement solution set comprises generating a set of available placement sequences for each case CU of the complete and stable mixed case arrangement plan 184, and selecting from the set of available placement sequences, based on a predetermined criteria, a best placement sequence solving sequencing of the case CU that defines the at least part of the sequence solution of the case placement sequence solution set. In another aspect, generating the case placement solution set comprises generating a set of available placement sequences for each case CU of the complete and stable mixed case arrangement plan 184 so as to characterize the sequence flexibility of the case in placement sequence.

As an example, to generate the sequence solution sets the flexible sequencer 297 starts from a node(s) (e.g. cases CU) on a free edge/side (independent) of the layer (e.g., top, sides, etc.) disposed as per the pallet arrangement plan 184. The flexible sequencer 297 traverses in a progression direction through the matrix for each node to identify corresponding interdependent or subordinated nodes (cases), and paths (or links) of subordinations, (see FIG. 3A—illustrating, as previously described, a two-dimensional representative layer L1001 of cases (which is representative of any one or more of layers, or a portion thereof, L121-L125, L12T) and FIGS. 9A and 9B illustrating matrix representations, of the cases in FIG. 3A according to the pallet arrangement plan 184, that include progression directions similar to the progression direction illustrated in FIG. 9C). The progression direction may correspond or otherwise conform to the degrees of freedom (e.g., three linear degrees of freedom) of the pallet building robot(s) 14 case gripping tool (e.g., end of arm tool for gripping case unit(s)) in the pallet build area 1000. Accordingly, the matrix is investigated or otherwise searched in directions corresponding to each pallet building robot (noting the matrix 999A in FIG. 9A corresponds with pallet building robot 14A and the matrix 999B in FIG. 9B corresponds with pallet building robot 14B) and sequence solution sets (see FIG. 11 which illustrates an exemplary sequence solution set) are developed for each case CU and each corresponding pallet building robot 14. As an example, referring to FIG. 9C that schematically illustrates an interdependence or subordination (i.e., case interference) between respective nodes of the matrix (e.g., cases in the plan layer) in the progression direction. Here there is a progress path/link LP towards what is referred to for description purposes as an inedge of a case (node 2), which means there is one case (node 1) blocking it (e.g., node 2 is interdependent/subordinate with respect to node 1, and conversely node 1 is independent of node 2 along the path LP). Referring also to FIGS. 9A and 9B, it is seen that case or node 5 is (on the one hand, in the matrix solution represented by FIG. 9A for robot #1) independent from the other cases on the side of pallet building robot 14A (e.g., robot #1) because there is no inedge of case 5. Similarly, case 3 is (on the other hand, in the matrix solution represented by FIG. 9B for robot #2) independent from the other cases on the side of pallet building robot 14B (e.g., robot #2) because there is no inedge of case 3. Hence, the solution represented by FIGS. 9A and 8B may be considered to form a solution set for sequenced cases to build the pallet arrangement plan layer represented by the matrix 999A, 999B in FIGS. 9A, 9B with robot #1 and robot #2. In that solution set, both case 3 and case 5 are available independent cases and can be placed by the assigned pallet building robots 14A, 14B regardless of placement order of the other cases CU. Thus, as may be realized, in the sequence solution set reduced to a common sequence solution respectively addressed to both robot #1 and robot #2 (in this example) the independence of case 3 and case 5 allows freedom of placement with respect to each other so that they may be resequenced in placement order with respect to each other. This freedom of placement (manifested by case independence determined during development of the sequence solution sets) is a flexibility defined in the sequence solution.

The progression paths LP form the basis of the sequence solution sets (as shown, each path LP in the progression is a representation of a possible solution set, see FIG. 11, at least if considered in the opposite sense). It is noted that, for each case CU there are one or more possible sequence solution sets (as there are one or more possible paths LP). Accordingly, the flexible sequencer 297 explores heuristically the layer L1001 as shown in FIG. 11 to develop a desired number of available sequence solution sets for each case CU, for each pallet building robot 14A, 14B (here there are two robots, but in other aspects there may be one or more robots), suitable to provide a defined deterministic sequence solution and deterministic flexibility of cases CU (e.g., sequence independencies/insubordination vis a vis other cases CU in the layer L1001) to limit run time. A solution limit is added to the sequence solution determination that limits sequence solution search recursion down the solution tree. The possibility of infinitely looping in the graph search method is then removed. The sequence solution search can effectively terminate the search at, for example, a limit of 3000 solutions considering time, complexity, and branching as factors for flexible sequencing. It is noted that search limit of 3000 solutions is used for exemplary purposes only and in other aspects the search limit may be greater than or less than 3000 solutions.

Figure 12:
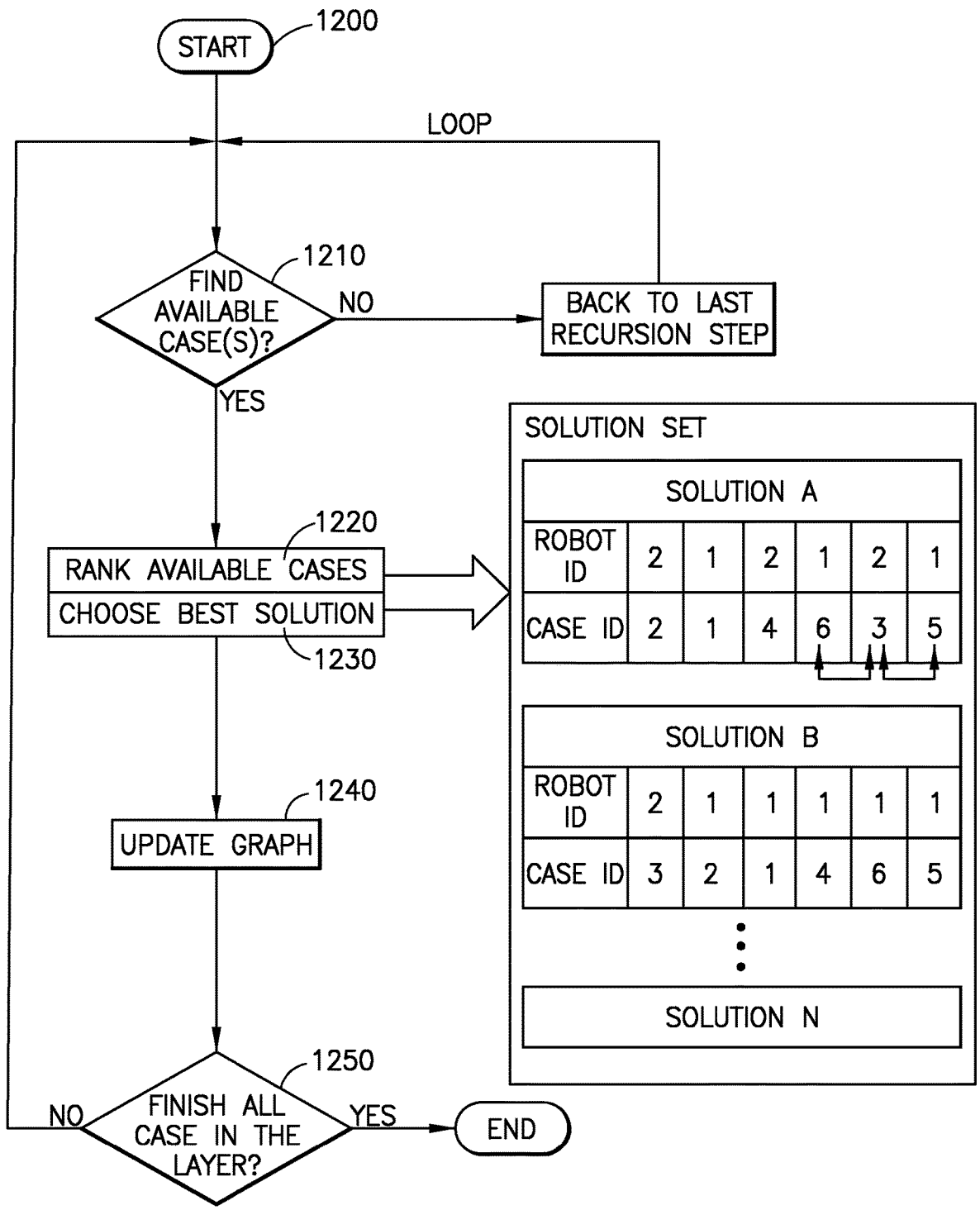
FIG. 12 is an exemplary flow diagram for flexible sequencing of cases in the automated material handling system of FIG. 2 in accordance with aspects of the present disclosure.

Referring to FIGS. 3A, 11 and 12, as noted herein, the flexible sequence is developed using the graph search method. The flexible sequencer 297 starts at the initial state 1100 (FIG. 12, Block 1200) and continues running (see "loop" in FIG. 12), e.g., the depth first search on a case by case traversal for each case/robot access until a desired number of flexible sequences are found (e.g., all solutions have been searched for the current pallet layer or a predetermined number of solutions (per the runtime limit) for the current pallet layer, depending on which comes first). As noted above, each case is considered a node, and the paths LP between the nodes/cases are derived from a case interference check (see FIG. 9C). At each step (e.g., see FIG. 11, steps 900A, 900AR1, 900AR2 . . . 900ARi and steps 900B, 900BR1, 900BR2 . . . 900BRi), the flexible sequencer finds the cases in the current layer that can be reached by the pallet building robot(s) using the case interference check. Again, for each case, the flexible sequencer commences at the outermost (for a given reference frame of the pallet building robot 14A, 14B) case subordination and generates the interdependent (linkage) paths LP. A set of interdependent (linkage) paths (formed of subordinated dependency links) are generated for each case (and corresponding pallet building robot 14A, 14B, see the different matrices and respective linkage paths in FIG. 11 corresponding to each different step 900A, 900AR1, 900AR2 . . . 900ARi and steps 900B, 900BR1, 900BR2 . . . 900BRi and thus each case, noting that "Rob1" is robot 1 and "Rob2 is robot 2). The result is a set of one or more interdependent paths LP mapped for each possible (available) traverse direction (i.e., from each node the path traverse may progress in each degree of freedom (X, Y, Z—noting that only two-dimensional representations are shown in the figures for illustrative purposes). As an example, the flexible sequencer starts at an initial state with an empty sequence 1100 and then tries to find all the available cases CU (in this examples cases/nodes 1-6) in the current layer L1001 that can be reached by the pallet building robot(s) 14A, 14B (FIG. 12, Block 1210) (i.e., no inedge (pose independent) from the other cases). Thus, the independent (insubordinate) cases (i.e., cases that can be reached by the corresponding pallet building robot 14A, 14B) are identified as available (in each of the path LP sets for the given case) and resolved into sequence solutions (see sequence solutions A, B, . . . , N, in FIG. 12 where N is any suitable integer denoting an upper limit to the number of sequence solutions) for a corresponding pallet building robot 14A (robot #1), 14B (robot #2) based on ranking the available case(s) (FIG. 12, Block 1220) (both individually and in order (suborder) of the solution of a set of solutions) according to pallet stability optimization criteria, and throughput optimization criteria registered with the flexible sequencer 297. For example, the flexible sequencer 297 ranks those available cases based on a stability and balance score. The flexible sequencer 297 then chooses a case (or in other words a case sequence solution) with a higher rank (e.g., the best solution) (FIG. 12, Block 1230). Stability optimization criteria factors may include a layer-based palletizing sequence to reduce unstable stack building/minimum case overhang, handling unstable cases in planned pallets by forcing on "support" for unstable cases, calculating stability metrics for optimal output, handling case dimension variation (e.g., the greater the dimensional variance, the greater (later) in the sequence order), end of arm tools/robot controls to secure case(s) inside the end of arm tool during high-speed robot movement to improve robot placement accuracy, or any other suitable stability optimization criteria factors. Throughput optimization criteria factors may include allowing pallet building robot(s) to pick/place multiple cases (e.g., of the same stock keeping unit) in one pick-placement cycle, for multiple-robot palletizing the robot wait time is minimized by forcing on alternative palletizing sequence(s) (e.g., sequences are selected to alternate place motions between robots) for the pallet building robots (e.g., sequence ID1 for robot 1, sequence ID 2 for robot 2, sequence ID 3 for robot 1, sequence ID 4 for robot 2, etc.), for multiple-robot palletizing sequence(s)/path(s) are generated to separate robot work zones to allow multiple robots to simultaneously place cases to the same pallet, or any other suitable throughput optimization criteria factors.

As each available case is identified in progression (ranked and resolved into a sequence solution as further described) the matrix 999A, 999B is updated and reduced (FIG. 12, Block 1240) (i.e., sequenced cases are removed, in effect so that what had been subordinate cases to the "removed" cases, are in turn unsubordinated and accessible/independent) as illustrated in part progression steps 900A, 900AR1, 900AR2 . . . 900Ari and steps 900B, 900BR1, 900BR2 . . . 900BRi in FIG. 11 (where i is any suitable integer denoting an upper limit on the number of steps). For example, case 5 of matrix 999A is sequenced for robot 1 by the flexible sequencer 297 and the matrix 999A is reduced by removing case 5 so as to form reduced matrix 999AR. The flexible sequencer 297 in part progression step 900B flexibly sequences case 3 for robot 14B (robot #2) and case 6 for robot 14A (robot #1), where formerly subordinate cases 3 and 6 have become unsubordinated. Continuing in part progression step 900AR with matrix 999AR where case 3 is sequenced for robot 14B (robot #2), the matrix 999AR is reduced to matrix 999AR1 by removing case 3. Likewise, in part progression step 900BR case 6 of the matrix 999BR is sequenced for robot 14A and the then the matrix 999BR is reduced in the manner described herein for further progression. Continuing in part progression steps 900AR1 and 900BR1, the matrix 999AR is reduced to matrices 999AR1, 999BR1 where the flexible sequencer 297 sequences case 6 for picking by either robot 14A (robot #1) or robot 14B (robot #2) where case 6, which was a subordinate case for robot 14B has now become an unsubordinated case. Further continuing with part progression steps 900AR2, 900BR2, the matrix 900AR1 is further reduced to matrices 999AR2, 999BR2 with the removal of case 6 and the flexible sequencer 297 sequences case 4 for picking by either robot 14A (robot #1) or robot 14B (robot #2) where case 4, which was a subordinate case for both robots 14A, 14B has now become an unsubordinated case. The progression of the parts of the progression steps illustrated in FIG. 11 to generate the sequence solution (e.g., solution A, solution B, solution N illustrated in FIG. 12) representing a sequence solution step 1210 of FIG. 12 continues and the The progression of the parts of the progression steps illustrated in FIG. 11 to generate the sequence solution (e.g., solution A, solution B, . . . , solution N illustrated in FIG. 12) representing a sequence solution step 1210 of FIG. 12 continues and the matrix continues to be updated and reduced as the available case are identified (ranked and resolved into a sequence solution as further described) until all cases are sequenced in at least one or more available solution(s) of a solution set for the current layer L1001 (FIG. 12, Block 1250). At the end of each step 1210 the flexible sequencer updates the pallet structure and the neighboring cases in the layer model so as to reduce down the graph by solving the sequence solution per case. This is repeated until all nodes in the matrix (i.e., cases in the layer or portion thereof) are sequenced into a sequence solution (e.g., solution A, solution B, . . . , solution N), and continued in solution development recursions generating a developed solution set (e.g., solution A, solution B, . . . , solution N) as previously described.

Each available sequence solution of available cases of the generated sequence solution set (e.g., solution A, solution B, . . . , solution N) is ranked applying the pallet stability optimization criteria and throughput optimization criteria. For example, referring to FIGS. 10A-10D a representation of sequence solution A and sequence solution B (of the sequence solution set) generating the pallet load PAL according to the solution sequence is illustrated. The two exemplary solutions (solution A and solution B—in other aspects there may be more than two solutions) of the sequence solution set for placing cases in the pallet layer L1001 will be described. Each of solution A and solution B is provided with a balance score and a stability score. The balance score calculates how often one single robot continually places multiple cases in a row. The flexible sequencer 297 forces alternative palletizing routines for the multiple pallet building robots 14. The alternative palletizing routines can help minimize robot (end of arm tool) place wait times. The flexible sequencer 297 employs a greedy method to make a best choice at each step of searching the flexible sequences. The greedy method facilitates consideration of solutions with better performance (compared to solutions already found) even when a solution limit is imposed. Here the balance score for solution A is zero while the balance score for solution B is 4. It is noted that solution A has a better balance score which may help minimize robot place (end of arm tool) wait time.

The stability score may be applied on a case-by-case basis. The flexible sequencer 297 searches for flexible sequences, where some solutions are discounted (or excepted) because the evaluated stability through them cannot satisfy the requirements of pallet building. For other solutions, the flexible sequencer 297 employs a greedy method to make the best choice of stability at each step. Referring to case 3 as an example, the stability score is the height to width ratio of the case. Here, case 3 (referring to Table 1) may have a height of about 418 mm and width of about 175 mm so that the stability score of case 3 is about 2.39. The flexible sequencer 297 is programmed with any suitable stability score tolerance that identifies an unstable case. For exemplary purposes, the stability score tolerance may be set at about 1.6 (or any other suitable tolerance) and because case 3 has a stability score greater than the stability score tolerance, the flexible sequencer 297 identifies case 3 as an unstable case. Considering solution B (see FIG. 10A), the flexible sequencer 297 may sequence cases so that case 3 is placed without side support (see FIG. 10D) hence solution B is not a stable case placement sequence. Considering solution A (FIGS. 10B and 10C), the flexible sequencer may sequence case placement so that case 3 is placed with (or after) case 2 giving side support to case 3 (noting the case placement flexibility in solution A where case 3 can be placed before or after case 6 and cases 5 and 6 can be placed independent of each other as determined with respect to FIG. 11 described above). Based on an overall stability score (which may be determined in any suitable manner) calculated by the flexible sequencer 297, solution A has a better stability score.

To determine the sequence solution from the available solution set, using solution A as an example, the generation of the sequence solution also identifies the flexibility (in sequence) for each case relative to a respective case in the sequence solution. Again, referring to FIGS. 9A, 9B and 11, an inedge of a case (case/node 2) means there is one case (case/node 1) blocking it (e.g., node 2 is interdependent/ subordinate with respect to node 1, and conversely node 1 is independent of node 2). Case or node 5 is independent from the other cases on the side of pallet building robot 14A (robot #1) because there is no inedge of case 5. Similarly, case 3 is independent from the other cases on the side of pallet building robot 14B (robot #2) because there is no inedge of case 3. Both case 3 and case 5 are available cases and can be placed by the assigned pallet building robots 14*a*, 14*b* regardless of placement order of the other cases. Here cases 3 and 5 are independent/available for the corresponding pallet building robot 14*a*, 14*b* and may be placed regardless of order (e.g., sequence flexibility of solution A (see FIG. 12) is identified with respect to cases 3 and 5, so these cases may be placed respectively in the event of a misqueue as for solution A, noting that similar flexibilities may be generated for other cases in the sequence (e.g., case 3 vis a vis case 6, etc.—see FIGS. 11 and 12)). This placement flexibility maintains a substantially continuous pick/place motion of the pallet building robot(s) 14 at an optimum rate to build the pallet load in a continuous optimum manner.

In one aspect, the flexible sequencer 297 is configured to verify the determined sequence solutions. For example, after a sequence solution is determined or a dead end is reached (no solution) the flexible sequencer 297 back tracks the sequence (e.g., the flexible sequencer 297 reconstructs the pallet building model according to the generated sequence solution and is representative of constraints of the pallet load PAL as shown in FIG. 10A-10D; i.e., reconstruction (e.g., shown in FIG. 10D should match the pallet building model plan shown in FIG. 3A). Then the flexible sequencer 297 explores a next available sequence solution. For example, the flexible sequencer 297 may apply the determined sequence solution and compare the result to the initial pallet building model (such as that shown in FIG. 1A).

In the event of a hardware anomaly (e.g., one of the pallet building robots 14 becoming unavailable) the flexible sequencer 297 is configured to regenerate a pallet sequence solution in a manner similar to that described above for the pallet build with the operable pallet building robot (either pallet building robot 14A or pallet building robot 14B). For example, assuming for illustrative purposes that pallet building robot 14B becomes unavailable, the flexible sequencer 297 regenerates the pallet sequence solution for the available pallet building robot 14A so that cases committed to the side of the palletizer 162 on which the unavailable pallet building robot 14B is located are included in the sequence solution for the operable pallet building robot 14A and a preferred relative placement sequence is determined by the position of the mixed cases from the structure of the mixed cases being infed to the palletizer 162.

In accordance with one or more aspects of the present disclosure an automated palletizer for building a mixed case pallet is provided. The automated palletizer comprises:

a case infeed that feeds mixed cases so as to provide an input queue feed sequence of mixed cases;

at least one pallet building robot communicably connected to the case infeed and configured to receive the mixed cases in the input queue feed sequence of mixed cases, and place the mixed cases according to and dependent on the input queue feed sequence of mixed cases so as to effect building the mixed case pallet at a predetermined substantially steady placement rate;

a controller communicably connected to the case infeed and the at least one pallet building robot, and being configured so as to generate a complete and stable mixed case arrangement plan that completes at least a predetermined whole part of the mixed case pallet and that describes a predetermined planned location and pose for each case of the complete and stable mixed case arrangement plan of the predetermined whole part of the mixed case pallet;

wherein the controller is configured to generate, from the complete and stable mixed case arrangement plan, a case placement sequence solution set wherein each sequence solution sequences placement of the mixed cases building the mixed case pallet, and wherein the solution set resolves building, with the at least one pallet building robot, the mixed case pallet based on the complete and stable mixed case arrangement plan that presents a n-p hard problem sequencing the mixed cases building the mixed case pallet, and wherein the case placement sequence solution set characterizes sequence flexibility in placement sequence of the mixed cases building the mixed case pallet with the at least one pallet building robot; and wherein the controller is configured to communicate at least part of a sequence solution from the case placement sequence solution set to the case infeed so as to provide the input queue feed sequence of mixed cases, and to communicate the sequence flexibility to the at least one pallet building robot to resolve a mis-queue in the input queue feed sequence of mixed cases so that the pallet building robot case placement is substantially continuous building the mixed case pallet at the predetermined substantially steady placement rate.

In accordance with one or more aspects of the present disclosure characterizing the sequence flexibility identifies one or more of the mixed cases in the complete and stable mixed case arrangement plan that have a predetermined characteristic that determines that at least one of the one or more of the mixed cases is sequenced independent relative to the at least part of the sequence solution.

In accordance with one or more aspects of the present disclosure the predetermined characteristic is positional independence of each of the at least one of the one or more of the mixed cases relative to an adjoining case in the complete and stable mixed case arrangement plan.

In accordance with one or more aspects of the present disclosure the positional independence is determined from the case placement sequence solution set generated for the at least one of the one or more of the mixed cases.

In accordance with one or more aspects of the present disclosure generating the case placement solution set comprises generating a set of available placement sequences for each case of the complete and stable mixed case arrangement plan, and selecting from the set of available placement sequences, based on a predetermined criteria, a best placement sequence solving sequencing of the case that defines the at least part of the sequence solution of the case placement sequence solution set.

In accordance with one or more aspects of the present disclosure generating the case placement solution set comprises generating a set of available placement sequences for each case of the complete and stable mixed case arrangement plan so as to characterize the sequence flexibility of the case in placement sequence.

In accordance with one or more aspects of the present disclosure an automated palletizer for building a mixed case pallet is provided. The automated palletizer comprises:

a case infeed that feeds mixed cases so as to provide an input queue feed sequence of mixed cases;

at least one pallet building robot communicably connected to the case infeed and configured to receive the mixed cases in the input queue feed sequence of mixed cases, and place the mixed cases according to and dependent on the input queue feed sequence of mixed cases so as to effect building the mixed case pallet at a predetermined substantially steady placement rate;

a controller communicably connected to the case infeed and the at least one pallet building robot, and being configured so as to generate a complete and stable mixed case pallet structure in a predetermined arrangement that describes location and pose of each case of the mixed cases of the complete and stable mixed case pallet structure;

wherein the controller is configured to generate a case placement sequence solution set that, resolves placement sequence of at least one of the mixed cases so as to place the at least one of the mixed cases with the at least one pallet building robot building the complete and stable mixed case pallet structure, and that reduces the predetermined arrangement of the complete and stable mixed case pallet structure by the at least one of the mixed cases substantially unconstrained by one or more of predetermined characteristics defining pallet structure and structure of the mixed cases of the complete and stable mixed case pallet structure.

In accordance with one or more aspects of the present disclosure the controller is configured so that generation of the case placement sequence solution set is substantially unconstrained by the one or more of the predetermined characteristics defining pallet structure and the structure of the mixed cases of the complete and stable mixed case pallet structure.

In accordance with one or more aspects of the present disclosure the controller is configured to communicate at least part of a sequence solution from the case placement sequence solution set to the case infeed so as to provide the input queue feed sequence of mixed cases including the at least one of the mixed case.

In accordance with one or more aspects of the present disclosure the predetermined arrangement of the complete and stable mixed case pallet structure is reduced by the at least one of the mixed cases case upon characterizing sequence flexibility of the at least one of the mixed cases within the case placement sequence solution set.

In accordance with one or more aspects of the present disclosure the controller is configured to determine a sequence flexibility, based on the characterized sequence flexibility, and communicate the sequence flexibility to at least one pallet building robot to resolve a mis-queue in the input queue feed sequence of mixed cases so that the at least one pallet building robot continues building the mixed case pallet at the predetermined substantially steady placement rate.

In accordance with one or more aspects of the present disclosure the complete and stable mixed case pallet structure has a substantially flat deterministic top surface, so as to form a seating surface for interchangeably placing the mixed cases thereon, extending over a predetermined area of a pallet covered with multiple stacked mixed cases of the complete and stable mixed case pallet structure, or a free undeterministic surface forming a topmost boundary surface of the complete and stable mixed case pallet structure.

In accordance with one or more aspects of the present disclosure an automated palletizer for building a mixed case pallet is provided. The automated palletizer comprises:

a case infeed that feeds mixed cases so as to provide an input queue feed sequence of mixed cases;

at least one pallet building robot communicably connected to the case infeed and configured to receive the mixed cases in the input queue feed sequence of mixed cases, and place the mixed cases according to and dependent on the input queue feed sequence of mixed cases so as to effect building the mixed case pallet at a predetermined substantially steady placement rate;

a controller communicably connected to the case infeed and the at least one pallet building robot, and being configured so as to generate a complete and stable mixed case pallet structure in a predetermined arrangement that describes location and pose of each case of the mixed cases of the complete and stable mixed case pallet structure;

wherein the controller is configured to generate a case placement sequence solution set for building the complete and stable mixed case pallet structure with the at least one pallet building robot through reduction of the predetermined arrangement of the complete and stable mixed case pallet structure by at least one of the mixed cases substantially unconstrained by one or more of predetermined characteristics defining pallet structure and structure of the mixed cases of the complete and stable mixed case pallet structure, and wherein the case placement sequence solution set resolves placement sequence of the at least one of the mixed cases so as to place the at least one of the mixed cases with the at least one pallet building robot building the complete and stable mixed case pallet structure.

In accordance with one or more aspects of the present disclosure the controller is configured so that generation of the case placement sequence solution set is substantially unconstrained by the one or more of the predetermined characteristics defining pallet structure and the structure of the mixed cases of the complete and stable mixed case pallet structure.

In accordance with one or more aspects of the present disclosure the controller is configured to communicate at least part of a sequence solution from the case placement sequence solution set to the case infeed so as to provide the input queue feed sequence of mixed cases including the at least one of the mixed case.

In accordance with one or more aspects of the present disclosure the predetermined arrangement of the complete and stable mixed case pallet structure is reduced by the at least one of the mixed cases case upon characterizing sequence flexibility of the at least one of the mixed cases within the case placement sequence solution set.

In accordance with one or more aspects of the present disclosure the controller is configured to determine a sequence flexibility, based on the characterized sequence flexibility, and communicate the sequence flexibility to at least one pallet building robot to resolve a mis-queue in the input queue feed sequence of mixed cases so that the at least one pallet building robot continues building the mixed case pallet at the predetermined substantially steady placement rate.

In accordance with one or more aspects of the present disclosure the complete and stable mixed case pallet structure has a substantially flat deterministic top surface, so as to form a seating surface for interchangeably placing the mixed cases thereon, extending over a predetermined area of a pallet covered with multiple stacked mixed cases of the complete and stable mixed case pallet structure, or a free undeterministic surface forming a topmost boundary surface of the complete and stable mixed case pallet structure.

It should be understood that the foregoing description is only illustrative of the aspects of the present disclosure. Various alternatives and modifications can be devised by those skilled in the art without departing from the aspects of the present disclosure. Accordingly, the aspects of the present disclosure are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the present disclosure.

What is claimed is:

1. An automated palletizer for building a mixed case pallet, the automated palletizer comprising:
   a case infeed that feeds mixed cases and that provides an input queue feed sequence of mixed cases to at least one pallet building robot;
   the at least one pallet building robot is communicably connected to the case infeed and accesses the mixed cases of the input queue feed sequence, the at least one pallet building robot is configured to:
      receive the mixed cases in the input queue feed sequence of mixed cases, and place the mixed cases according to input queue feed sequence of mixed cases, so as to effect building the mixed case pallet at a predetermined and substantially steady placement rate;
   the controller is communicably connected to the case infeed and the at least one pallet building robot, the controller being configured so as to:
      generate a complete and stable mixed case arrangement plan that completes at least a predetermined whole part of the mixed case pallet, and that describes a predetermined planned location and pose for each case of the complete and stable mixed case arrangement plan;
   wherein the controller is configured to:
      generate, from the complete and stable mixed case arrangement plan, a case placement sequence solution set, wherein each sequence solution determines a sequence for placement of the mixed cases that build the mixed case pallet, and
      wherein the solution set resolves building, with the at least one pallet building robot, the mixed case pallet based on the complete and stable mixed case arrangement plan, the mixed case arrangement plan presenting an n-p hard problem sequencing the mixed cases that build the mixed case pallet, and
      wherein the case placement sequence solution set characterizes a sequence flexibility in the placement sequence of the mixed cases that build the mixed case pallet with the at least one pallet building robot; and
   wherein the controller is configured to:
      communicate at least part of a sequence solution from the case placement sequence solution set to the case infeed to provide the input queue feed sequence of mixed cases, and
      communicate the sequence flexibility to the at least one pallet building robot to resolve a mis-queue in the input queue feed sequence of mixed cases, so that the pallet building robot case placement is substantially continuously building the mixed case pallet at the predetermined and substantially steady placement rate.

2. The automated palletizer of claim 1, wherein characterizing the sequence flexibility identifies one or more of the mixed cases in the complete and stable mixed case arrangement plan that have a predetermined characteristic, the predetermined characteristic determines that at least one of the one or more of the mixed cases is sequenced independent relative to the at least part of the sequence solution.

3. The automated palletizer of claim 2, wherein the predetermined characteristic is positional independence of each of the at least one of the one or more of the mixed cases relative to an adjoining case in the complete and stable mixed case arrangement plan.

4. The automated palletizer of claim 3, wherein the positional independence is determined from the case placement sequence solution set generated for the at least one of the one or more of the mixed cases.

5. The automated palletizer of claim 1, wherein generating the case placement solution set comprises:
   generating a set of available placement sequences for each case of the complete and stable mixed case arrangement plan, and
   selecting from the set of available placement sequences, based on a predetermined criteria, a best placement sequence for each chase included in the sequence solution.

6. The automated palletizer of claim 1, wherein generating the case placement solution set comprises generating a set of available placement sequences for each case of the complete and stable mixed case arrangement plan so as to characterize the sequence flexibility of the case in placement sequence.

7. An automated palletizer for building a mixed case pallet, the automated palletizer comprising:
   a case infeed that feeds mixed cases so as to provide an input queue feed sequence of mixed cases;
   at least one pallet building robot communicably connected to the case infeed, and configured to: receive the mixed cases in the input queue feed sequence of mixed cases, and place the mixed cases according to the input queue feed sequence of mixed cases, so as to effect building the mixed case pallet at a predetermined and substantially steady placement rate;
   a controller communicably connected to the case infeed and the at least one pallet building robot, the controller being configured to generate a complete and stable mixed case pallet structure in a predetermined arrangement that describes a location and pose of each case of the mixed cases of the complete and stable mixed case pallet structure;

wherein the controller is configured to generate a case placement sequence solution set that: resolves a placement sequence of at least one of the mixed cases, that places the at least one of the mixed cases with the at least one pallet building robot building the complete and stable mixed case pallet structure, and reduces the predetermined arrangement of the complete and stable mixed case pallet structure by at least one of the mixed cases, substantially unconstrained by one or more of predetermined characteristics defining structure of the mixed cases of the complete and stable mixed case pallet structure.

8. The automated palletizer of claim 7, wherein the controller is configured so that generation of the case placement sequence solution set is substantially unconstrained by the one or more of the predetermined characteristics defining pallet structure and the structure of the mixed cases of the complete and stable mixed case pallet structure.

9. The automated palletizer of claim 7, wherein the controller is configured to communicate at least part of a sequence solution from the case placement sequence solution set to the case infeed so as to provide the input queue feed sequence of mixed cases including the at least one of the mixed case.

10. The automated palletizer of claim 7, wherein the predetermined arrangement of the complete and stable mixed case pallet structure is reduced by at least one of the mixed cases upon characterizing a sequence flexibility of the at least one of the mixed cases within the case placement sequence solution set.

11. The automated palletizer of claim 10, wherein the controller is configured to: determine a sequence flexibility, based on the characterized sequence flexibility, and communicate the sequence flexibility to at least one pallet building robot to resolve a mis-queue in the input queue feed sequence of mixed cases so that the at least one pallet building robot continues building the mixed case pallet at the predetermined and substantially steady placement rate.

12. The automated palletizer of claim 7, wherein the complete and stable mixed case pallet structure has a substantially flat deterministic top surface, so as to: form a seating surface for interchangeably placing the mixed cases thereon, that extends over a predetermined area of the pallet covered with the multiple stacked mixed cases of the complete and stable mixed case pallet structure, or that forms a free undeterministic surface forming a topmost boundary surface of the complete and stable mixed case pallet structure.

13. An automated palletizer for building a mixed case pallet, the automated palletizer comprising:
a case infeed that feeds mixed cases to provide an input queue feed sequence of mixed cases;
at least one pallet building robot communicably connected to the case infeed, and configured to:
receive the mixed cases in the input queue feed sequence of mixed cases, and
place the mixed cases according to the input queue feed sequence of mixed cases so as to effect building the mixed case pallet at a predetermined and substantially steady placement rate;
a controller communicably connected to the case infeed and the at least one pallet building robot, and the controller being configured to generate a complete and stable mixed case pallet structure in a predetermined arrangement, the predetermined arrangement describing a location and pose of each case of the mixed cases of the complete and stable mixed case pallet structure;
wherein the controller is configured to generate a case placement sequence solution set for building the complete and stable mixed case pallet structure with the at least one pallet building robot by reducing the predetermined arrangement of the complete and stable mixed case pallet structure by at least one of the mixed cases, wherein the at least one of the mixed cases substantially unconstrained by one or more of predetermined characteristics that define the structure of the mixed cases of the complete and stable mixed case pallet structure, and
wherein the case placement sequence solution set resolves the placement sequence of at least one of the mixed cases so as to place the at least one of the mixed cases with the at least one pallet building robot building the complete and stable mixed case on the pallet structure.

14. The automated palletizer of claim 13, wherein the controller is configured so that the generation of the case placement sequence solution set is substantially unconstrained by the one or more of the predetermined characteristics defining the pallet structure and the structure of the mixed cases of the complete and stable mixed case pallet structure.

15. The automated palletizer of claim 13, wherein the controller is configured to communicate at least part of a sequence solution from the case placement sequence solution set to the case infeed, so as to provide the input queue feed sequence of mixed cases that includes the at least one mixed case.

16. The automated palletizer of claim 13, wherein the predetermined arrangement of the complete and stable mixed case pallet structure is reduced by the at least one of the mixed cases case upon characterizing a sequence flexibility of the at least one of the mixed cases within the case placement sequence solution set.

17. The automated palletizer of claim 16, wherein the controller is configured to determine a sequence flexibility, based on the characterized sequence flexibility, and communicate the sequence flexibility to at least one pallet building robot to resolve a mis-queue in the input queue feed sequence of mixed cases so that the at least one pallet building robot continues building the mixed case pallet at the predetermined and substantially steady placement rate.

18. The automated palletizer of claim 13, wherein the complete and stable mixed case pallet structure has a substantially flat deterministic top surface, so as to: form a seating surface for interchangeably placing the mixed cases thereon, that extends over a predetermined area of the pallet covered with the multiple stacked mixed cases of the complete and stable mixed case pallet structure, or that forms a free undeterministic surface forming a topmost boundary surface of the complete and stable mixed case pallet structure.

* * * * *